United States Patent [19]
Heller et al.

[11] Patent Number: 5,859,983
[45] Date of Patent: Jan. 12, 1999

[54] NON-HYPERCUBE INTERCONNECTION SUBSYSTEM HAVING A SUBSET OF NODES INTERCONNECTED USING POLYGONAL TOPOLOGY AND OTHER NODES CONNECT TO THE NODES IN THE SUBSET

[75] Inventors: Steven K. Heller, Chelmsford; Guy L. Steele, Jr., Lexington, both of Mass.

[73] Assignee: Sun Microsystems, Inc, Palo Alto, Calif.

[21] Appl. No.: 675,629

[22] Filed: Jul. 1, 1996

[51] Int. Cl.[6] ................................................ G06F 13/00
[52] U.S. Cl. .......................... 395/200.81; 395/800.01; 370/404; 370/406
[58] Field of Search .................... 395/200.81, 800.11, 395/800.12, 311, 800.01; 359/118; 370/255, 404, 406

[56] References Cited

U.S. PATENT DOCUMENTS

| | | | |
|---|---|---|---|
| 5,134,690 | 7/1992 | Samatham | 395/311 |
| 5,170,393 | 12/1992 | Peterson et al. | 370/255 |
| 5,170,482 | 12/1992 | Shu et al. | 395/800.12 |
| 5,313,645 | 5/1994 | Rolfe | 395/800.11 |
| 5,598,570 | 1/1997 | Ho et al. | 395/800.12 |
| 5,610,744 | 3/1997 | Ho et al. | 359/118 |
| 5,642,524 | 6/1997 | Keeling | 395/800.12 |

*Primary Examiner*—Le Hien Luu
*Attorney, Agent, or Firm*—Richard A. Jordan

[57] ABSTRACT

Interconnection subsystems having diverse topologies are disclosed for interconnecting small numbers of nodes having a predetermined maximum degree in a multiprocessor computer system. The interconnection subsystems are generally classified into three diverse classes of topologies, including a "polygonal" class, a "ladder" class and a "tiled" class. In topologies of the polygonal class, a majority of the nodes in the multiprocessor computer system are connected in a ring and the remaining nodes are connected to the nodes in the ring, and in some cases also to each other. In topologies of the ladder class, the nodes are interconnected in a "ladder" topology comprising a series of nodes connected in a ring, the ring corresponding to one standard of a ladder topology folded on itself. Each node in the ring is connected to another node in a second series, effectively forming rungs of the ladder topology. The nodes in the second series can be interconnected in a variety of arrangements, including a second ring, thereby effectively providing a second standard of the ladder topology. In topologies of the tiled class, the nodes are interconnected in tiled mesh-like topologies with six nodes for each mesh element, thereby providing a hexagonal or elongated "brick-like" non"square" rectangular arrangement. Edges of the mesh are preferably connected together to provide a folded toroid-like arrangement.

8 Claims, 19 Drawing Sheets

NON-HYPERCUBE INTERCONNECTION SUBSYSTEM HAVING A SUBSET OF NODES INTERCONNECTED USING POLYGONAL TOPOLOGY AND OTHER NODES CONNECT TO THE NODES IN THE SUBSET

FIELD OF THE INVENTION

The invention relates generally to the field of digital computer systems, and more particularly to multiprocessor systems having a relatively small number of processors. The invention particularly provides an interconnection subsystem for interconnecting processors to form a multiprocessor system.

BACKGROUND OF THE INVENTION

A number of types of multiprocessor computer systems have been developed which integrate a number of processors to increase the system's processing power beyond that which can be provided by a single processor. In a multiprocessor computer system, a plurality of processing nodes are interconnected by communication links which may comprise any suitable mechanism for transferring digital information, including, for example, wires, optical fibers, and the like.

A variety of types of interconnection arrangements have been developed for interconnecting processors in a multiprocessor computer system designed according to the distributed memory model, organized in a number of topologies. For small systems, comprising two or three processing nodes, a simple bus to which all processing nodes are connected may suffice. However, as the number of processing nodes increases, contention for the bus increases, which can slow down information transfer and the processing capability of the respective systems.

A variety of types of interconnection arrangements have been developed for interconnecting processors in a multiprocessor computer system, organized in a number of topologies. For small systems, comprising two or three processing nodes, a simple bus to which all processing nodes are connected may suffice. However, as the number of processing nodes increases, contention for the bus increases, which can slow down information transfer and the processing capability of the respective systems.

Most interconnection topologies that have been proposed, studied and/or implemented, other than the aforementioned bus, have been developed for systems including a large number of processing nodes, in particular, systems numbering in the hundreds or thousands of processing nodes. However, many systems that are desired commercially are much smaller, having, for example, as few as four or five processing nodes, up to as many as fifteen to twenty. For such systems, interconnection topologies that have been developed for large systems are often not economical. Another problem with such interconnection topologies is that they are typically based on the assumption that the systems with which they are to be used include a number of processing nodes corresponding to a power of two, and will be most economical for those numbers of processing nodes. If, for example, such a system at one time has a number of processing nodes corresponding to a power of two, it may be necessary to increase the interconnection subsystem considerably even if it is desired to increase the number of processing nodes by only one.

A number of communications metrics have been developed for assessing the various interconnection topologies, including the respective topology's "diameter," its "average distance," and its "normalized bisection bandwidth." A topology's diameter corresponds to the maximum distance, measured in number of communication links, over all pairs of processing nodes in the multiprocessor computer system, of the minimum number of communication links between respective processing node pairs. Essentially, if one "source" processing node is to transfer information to another "destination" processing node that is not connected directly thereto, the information will be transferred over a path from the source processing node, through one or more intermediate processing nodes until it is delivered to the destination processing node. The diameter generally indicates the maximum number of communication links required to transfer information from any processing node to any other processing node in the multiprocessor computer system, which, in turn, is a measure of the delay in transferring the information.

The average distance, on the other hand, is the average, over all pairs of processing nodes in the multiprocessor computer system, of the minimum distance, also measured in number of communication links, between respective processing node pairs, and is a general indication of the average delay, also represented in numbers of communication links, required to transfer information from one processing node to another in the multiprocessor computer system.

Finally, the normalized bisection bandwidth is determined by dividing the multiprocessor computer system into two sections, or "partitions," and determining the number of communication links between the processing nodes in the two partitions; the normalized bisection bandwidth is the smallest number of communication links for any set of such partitions that may be formed in the multiprocessor computer system, divided by one-half the number of processing nodes in the system. If the multiprocessor computer system contains an even number of processing nodes, each partition will have the same number of processing nodes. On the other hand, if the multiprocessor computer system contains an odd number of processing nodes, one partition will have one more processing node than the other partition. In any case, the normalized bisection bandwidth is a measure of the information-transfer bandwidth, represented in numbers of communication links, between partitions of processing nodes in the multiprocessor computer system.

SUMMARY OF THE INVENTION

The invention provides a new and improved interconnection subsystem for a multiprocessor computer system with a small number of processors using a switching arrangement of a limited degree, which provide desirable communications metrics.

In brief summary, the invention provides interconnection subsystems having diverse topologies, for interconnecting small numbers of processing nodes having a predetermined maximum degree (that is, a predetermined maximum number of bidirectional connections) in a multiprocessor computer system. The topologies of the interconnection subsystems are broadly classified into a number of general classes based on their topologies, including a "polygonal" class, a "ladder" class and a "tiled" class. In topologies of the polygonal class, at least a majority of the processing nodes in the multiprocessor computer system are connected in a ring and the remaining processing nodes are connected to the processing nodes in the ring, and in some cases also to each other.

In topologies of the ladder class, the processing nodes are interconnected in a "ladder" topology comprising a series of processing nodes connected in a ring, the ring corresponding to one standard of a ladder topology folded on itself. Each processing node in the ring is connected to another processing node in a second series, effectively forming rungs of the ladder topology. The processing nodes in the second series may also be interconnected in a second ring, thereby effectively providing a second standard of the ladder topology. Alternatively, the other processing nodes may be connected in other arrangements, illustratively an arrangement in which each processing node in the second series, instead of being connected to the next processing node in the second series, is connected to the "k-th" successive processing node in the series. As a further alternative, the ladder is twisted to effectively define a Moebius strip arrangement.

In topologies of the tiled class, the processing nodes are interconnected in tiled mesh-like topologies with (in the case of processing nodes of degree "three) six processing nodes for each mesh element, thereby providing a hexagonal or elongated "brick-like" non-"square" rectangular arrangement. Edges of the mesh are preferably connected together to provide a folded toroid-like arrangement.

In a refinement, instead of bidirectional connections, the interconnection subsystem makes use of a predetermined maximum number of pairs of unidirectional connections (in one embodiment, a maximum of two pairs of unidirectional connections).

The interconnection subsystems are selected to provide desirable communications metrics, particularly in multiprocessor computer systems which have relatively small numbers (on the order of from five to fifteen to twenty) of processing nodes.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
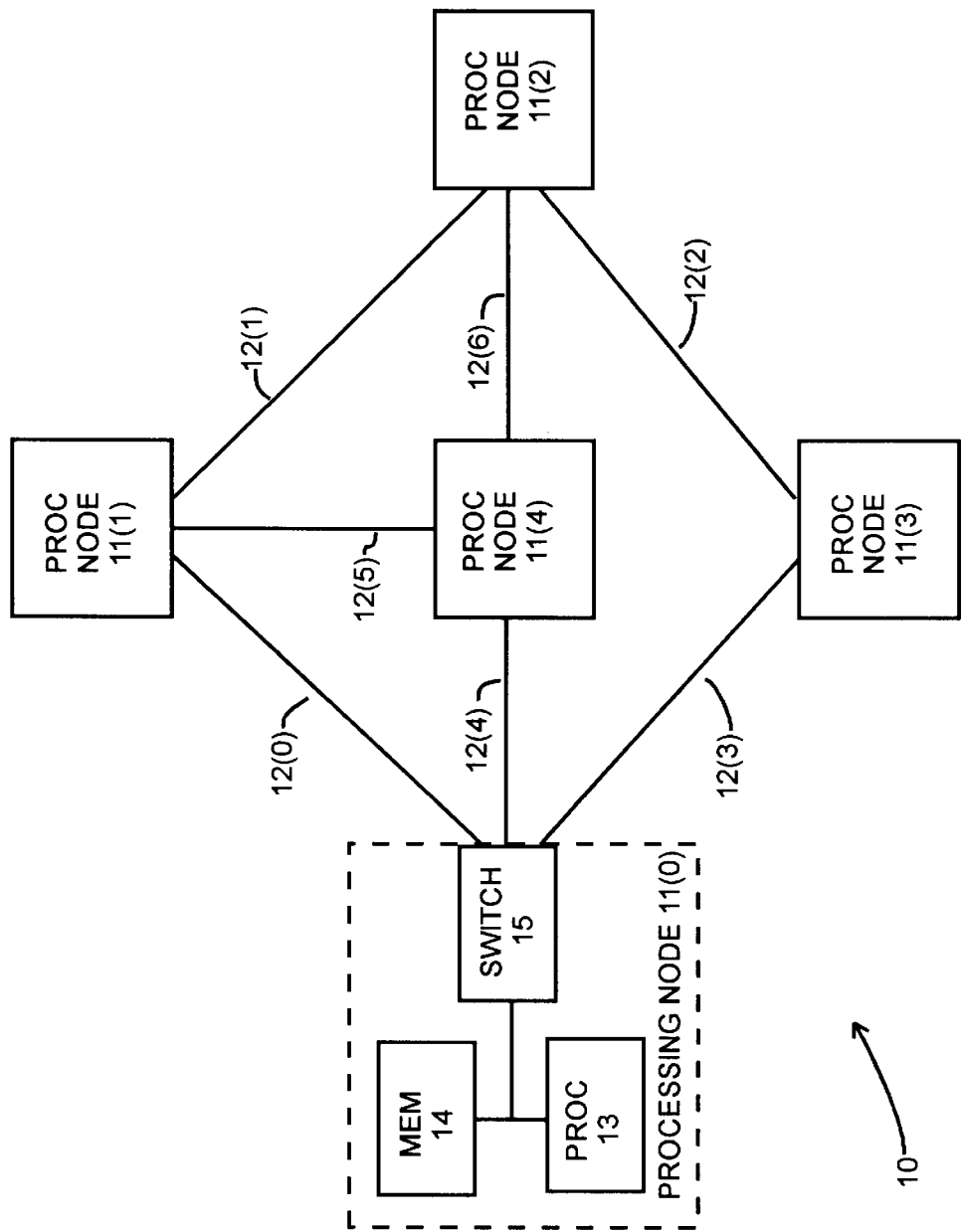
FIGS. 1 through 19 depict functional block diagrams of various multiprocessor computer systems constructed in accordance with the invention.

The invention provides an interconnection subsystem having a plurality of diverse topology for interconnecting processing nodes in a multiprocessor computer system. In accordance with the invention, the interconnection subsystem makes use of a number of diverse interconnection topologies, described below in connection with FIGS. 1 through 14, for interconnecting differing numbers of processing nodes, each having an interconnection "switch" integral therewith that has a predetermined "degree," or number of external bidirectional connections to communication links. Generally, in each interconnection subsystem described herein, each communication link is connected between switches of at most two "adjacent" processing nodes, and can provide communications therebetween; if a processing node, as a source processing node, is to communicate with a non-adjacent processing node, as a destination processing node, the source processing node does so through other processing nodes along a path from it (that is, the source processing node) to the destination processing node. In the interconnection subsystem in accordance with the invention, the degree of each switch is selected to be three, that is, each processing node is connected to at most three other processing nodes, and the interconnection topology that is described for each of the multiprocessor computer systems provides good or optimal communication metrics for the numbers of processing nodes in the respective system.

Interconnection subsystems in accordance with the invention are represented by interconnection graphs, which are described below, which comprise three general diverse classes, namely, a "polygonal" class, a "ladder" class, and a "tiled" class. The interconnection graphs comprise logical representations of the connections among processing nodes in the respective multiprocessor computer systems which are provided by the systems' communication links. Interconnection graphs of the polygonal class are generally represented by interconnection graphs which have a number of the processing nodes interconnected by communication links represented by a graph in the shape of a polygon, with those processing nodes, in turn, being connected to other processing nodes in the multiprocessor computer system in a selected manner. Interconnection graphs of the ladder class are generally represented by a ladder in which two communication links connected to each processing node effectively represent the ladder sidepieces and the third communication link represents the rungs; the interconnection graphs may be twisted one or more times along their lengths to form, for example, Moebius representations. Finally, the interconnection graphs of the tiled class are generally represented by interconnection graphs of predetermined shapes, with the processing nodes being located at, for example, the vertices of the respective shapes, which shapes are tiled over the representation to provide the required number of processing nodes for the multiprocessor computer system.

FIG. 1 depicts a multiprocessor computer system 10 which illustrates an interconnection system of the polygonal class. The multiprocessor computer system has five processing nodes 11(0) through 11(4) (generally identified by reference numeral 11(n)) interconnected by communication links 12(0) through 12(6) (generally identified by reference numeral 12(1)). All of the processing nodes 11(n) are generally similar, and only one processing node, namely processing node 11(0), is depicted in detail. As shown in FIG. 1, processing node 11(0) includes a processor 13, a memory 14 and a switch 15. As is conventional, the processor 13 performs processing operations in connection with information stored in its memory 14, and may also perform processing operations in connection with information stored in memories (not shown) of other processing nodes 11(n) (n≠0). If the processor 13 is to perform processing in connection with information stored in memories of other processing nodes 11(n) (n≠0), it can initiate communications through the switch 15 enable the information to be transferred to the processing node 11(0) for processing. In addition, the processor 13 can initiate communications with another processing node 11(n) (n≠0) through switch 15 to transfer information to the other processing node 11(n) (n≠0) for storage and/or processing by the other processing node 11(n) (n≠0). Similar operations can be performed by all of the processing nodes 11(n) in the system 10.

Information is transferred among processing nodes 11(n) in the system 10 over the communication links 12(1). In particular, when a processing node, such as processing node 11(0), is to transfer information to another processing node, the switch 15 of the transferring processing node 11(n) will initially transfer the information over one of the communication links that is connected thereto. Thus, if, for example, processing node 11(0) is to transfer information to one of the adjacent processing nodes 11(1), 11(4) or 11(3), the switch 15 of processing node 11(0) will transfer the information over respective communication link 12(0), 12(4) or 12(3). Similar operations can be performed by other processing nodes 11(n) (n≠0) to transfer information to their respective adjacent processing nodes 11(n') (n'≠n).

On the other hand, if the processing node 11(0) is to transfer information to the non-adjacent processing node 11(2), the switch of processing node 11(0) can initially transfer the information over any of the communication links 12(0), 12(4) or 12(3) to the switch (not shown) of respective processing node 11(1), 11(4) or 11(3), which, in turn, will forward the information to the processing node 11(2) over respective communication link 12(1), 12(6) or 12(2). Similar operations can be performed by other processing nodes 11(n) (n≠0) to transfer information to their respective non-adjacent processing nodes 11(n') (n'≠n). It will be appreciated that, for any information transfer from any one processing node 11(n), as a source processing node, to another processing node 11(n') (n'≠n) as a destination processing node, transfers over at most two communication links 12(1) are required, in which case the system 10 has a diameter of "two." In addition, the system 10 has an average distance of 1.04, and a normalized bisection bandwidth of 1.2.

As indicated above, the system 10 depicted in FIG. 1 has an interconnection subsystem whose interconnection graph is of the polygonal class. As depicted in FIG. 1, processing nodes 11(0) through 11(3) and communication links 12(0) through 12(3) form a graph, as shown in FIG. 1, that corresponds to a rectangle or, generally, a parallelogram. It will be appreciated that, for the switches associated with processing nodes 11(0) through 11(3), only two of the three communication links that can be accommodated by each of the switches is required to form the rectangle, and the third communication link can be used to connect to the fifth processing node 11(4). Since the processing node 11(4) can connect to only three communication links 12(1), the fifth processing node 11(4) can be connected to only three of the other processing nodes, namely, processing nodes 11(0) through 11(2).

Figure 2:
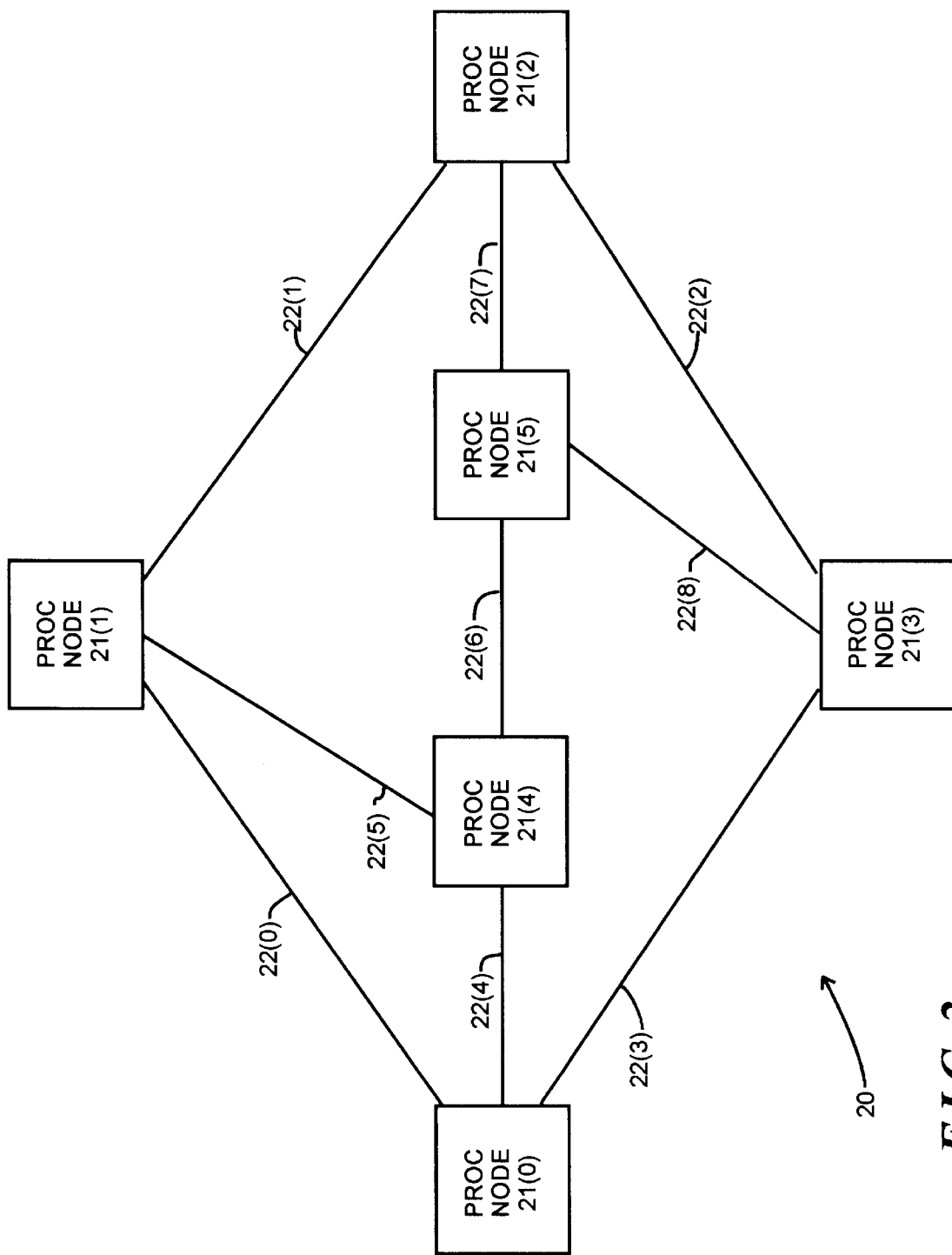

In a system such as multiprocessor computer system 10 depicted in FIG. 1, it is generally economical to add, for example, one processing node, in which case there will be a total of six processing nodes. FIG. 2 depicts an illustrative multiprocessor computer system 20 that includes six processing nodes 21(0) through 21(5), each of which is generally similar to processing node 11(0) depicted in FIG. 1. With reference to FIG. 2, the processing nodes 21(0) through 21(5) are interconnected by communication links 22(0) through 22(8). Processing nodes 21(0) through 21(4) of system 10 (FIG. 1) correspond to similarly-indexed processing nodes 11(0) through 11(4) of system 20 (FIG. 2), and communication links 22(0) through 22(5) of system 20 correspond to similarly-indexed communication links 12(0) through 12(5) of system 10. It will be appreciated that processing nodes 21(0) through 21(3) are interconnected by communication links 22(0) through 22(3) in an interconnection graph having the form of a parallelogram, in a manner similar to processing nodes 11(0) through 11(3) in system 10 (FIG. 1). Processing node 21(4) is connected to processing nodes 21(0) and 21(1) by communication links 22(4) and 22(5), effectively analogous to the connection of processing node 11(4) to processing nodes 11(0) and 11(1) by communication links 11(4) and 11(5) in system 10 (FIG. 1). In system 20, processing node 21(5) is connected to processing nodes 21(4), 21(2) and 21(3) by communication links 22(6), 22(7) and 22(8), respectively. It will be appreciated that the interconnection network in system 20 has a diameter of "two," an average distance of 7/6 (approximately 1.16) and a normalized bisection bandwidth of "one."

Figure 3:
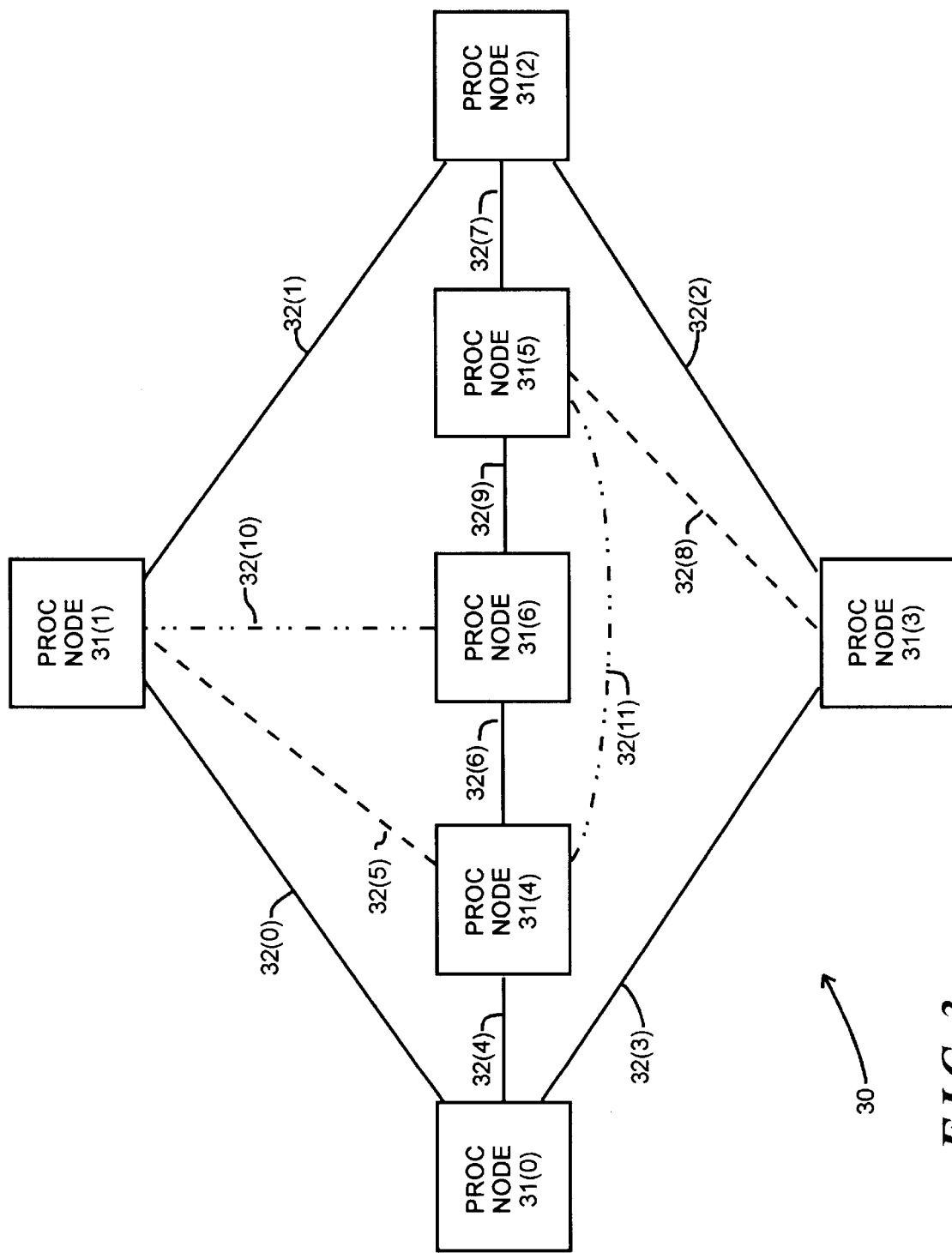

The interconnection graph concept illustrated by systems 10 and 20 (FIGS. 1 and 2) can be further extended by the addition of a processing node connected between processing nodes 21(4) and 21(5). FIG. 3 depicts a system 30 having seven processing nodes 31(0) through 31(6), with two interconnection subsystems having different interconnection graphs. In system 30, processing nodes 31(0) through 31(5) of system 30 correspond to similarly-indexed processing nodes 21(0) through 21(5) of system 20. Both interconnection subsystems which may be used in system 30 include the portions of the interconnection graphs represented by the communication links 30(0) through 30(3), which are represented by the solid lines in FIG. 3, which is in the form of a parallelogram. In addition, both interconnection subsystems include the portions of the interconnection graphs represented by communication links 32(4), 32(6), 32(7) and 32(9). One of the interconnection subsystems further includes the communication link 32(5) interconnecting processing nodes 31(1) and 31(4), and communication link 32(8) interconnecting processing nodes 31(3) and 31(5), both of which are represented by dashed lines. It will be appreciated that this interconnection subsystem has a diameter of "two," an average distance of 64/49 (approximately 1.3) and a normalized bisection bandwidth of 6/7.

The second interconnection subsystem depicted in FIG. 3 for system 30 also includes communication links 32(0) through 32(4), 32(6), 32(7) and 32(9), and further includes a communication link 32(10) interconnecting processing node 31(1) and 31(6), and a communication link 32(11) interconnecting processing node 31(4) and 31(5), both of which are represented by an alternating dashed and dotted line. It will be appreciated that this interconnection subsystem effectively interconnects processing nodes 31(4) through 31(6) in a graph having the form of a triangle, with communication links 32(6), 32(9) and 32(11) forming the sides of the triangular graph. This interconnection subsystem has a diameter of "three," an average distance of 1.347 and a normalized bisection bandwidth of 6/7.

Figure 4:
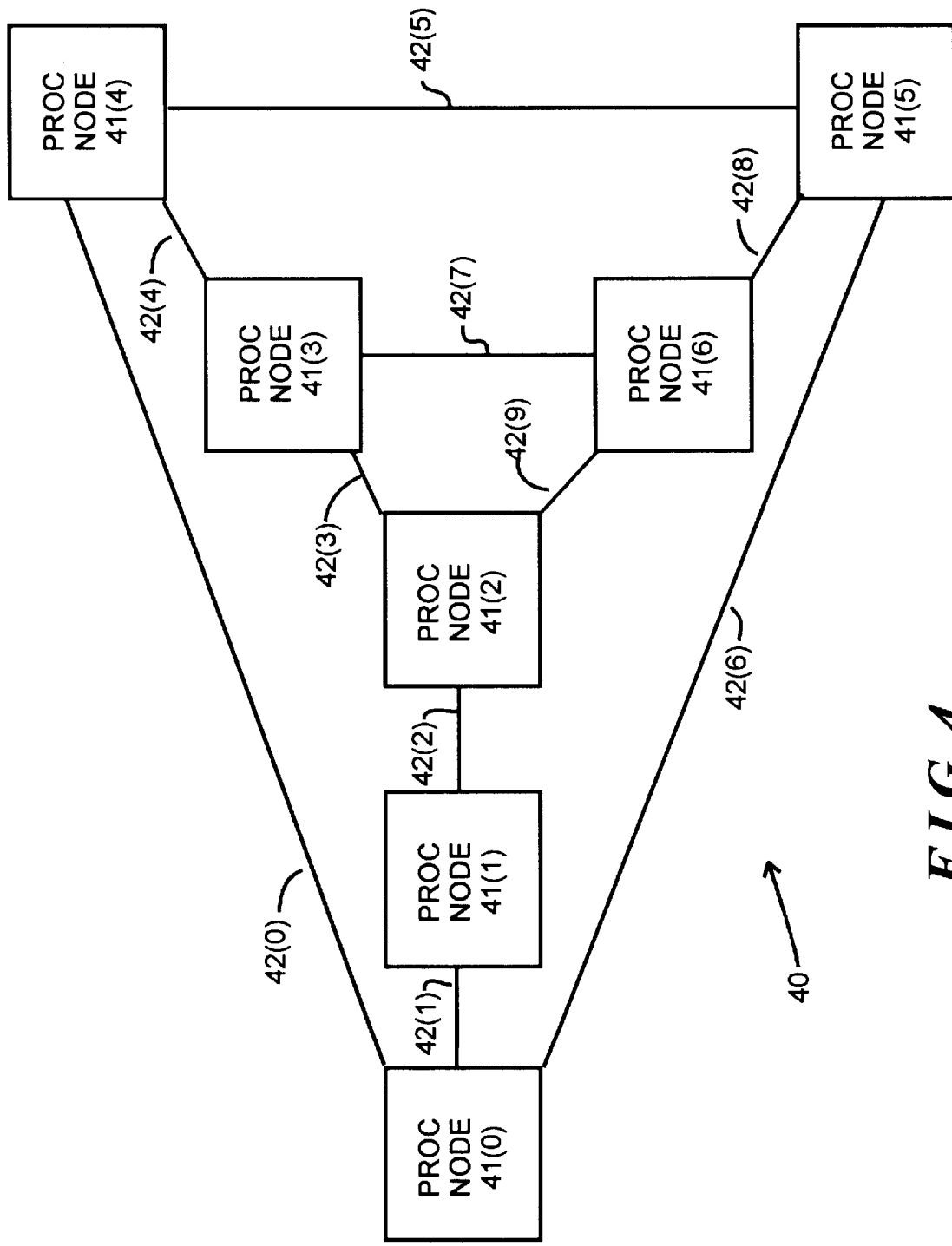

Other interconnection subsystems of the polygonal class, for interconnecting other numbers of processing nodes having switches of degree three, having diverse interconnection graphs, and having diverse polygonal forms, will be apparent to those skilled in the art. An alternate interconnection subsystem for interconnecting seven processing nodes (contrasting system 30, FIG. 3), using an interconnection graph of the polygonal class wherein the polygon is in the form of a triangle, is illustrated by system 40 depicted in FIG. 4. With reference to FIG. 4, system 40 comprises processing nodes processing nodes 41(0) through 41(6) interconnected by communication links 42(0) through 42(9). Communication links 42(0), 42(5) and 42(6) form an interconnection graph interconnecting processing nodes 41(0), 41(4) and 41(5) in the form of a triangle. It will be appreciated that communication links 42(3), 42(7) and 42(9) also form an interconnection graph interconnecting processing nodes 41(2), 41(3) and 41(6) in the form of a triangle, which is depicted in FIG. 4 interiorly of the triangular interconnection graph formed by communication links 42(0), 42(5) and 42(6). Processing node 41(3) of the "inner" triangle is connected to processing node 41(4) of the "outer" triangle by communication link 42(4), and processing node 41(6) of the "inner" triangle is connected to processing node 41(5) of the "outer" triangle by communication link 42(8). Processing node 41(2) of the "inner" triangle is connected to processing node 41(0) of the "outer" triangle through processing node 41(1), and associated communication links 42(1) and 42(2). As the communication metrics for the interconnection graph for system 40 depicted in FIG. 4 include a diameter of "two," an average distance of 1.3 and a normalized bisection bandwidth of 6/7.

As will be apparent to those skilled in the art, a number of modifications may be made to the system depicted in FIG. 4 to decrease or increase the number of processing nodes in the system. For example, a system of six processing nodes may be constructed by eliminating processing node 41(1), and systems of eight and nine processing nodes may be constructed by inserting processing nodes between processing nodes 41(3) and 41(4) (in the case of a system with eight processing nodes), and further between processing nodes 41(5) and 41(6) (in the case of a system with nine processing nodes) with appropriate communication links, substituting for communication links 42(4) and 42(8). If one of the inserted processing nodes for either the eight- or nine-processing node system is also connected to processing node 41(1) (since that processing node 41(1) is depicted in FIG. 2 as being only connected to two processing nodes 41(0) and 41(2), it can accommodate connection to another processing node), the diameter of the graph remains at "two."

Figure 16:
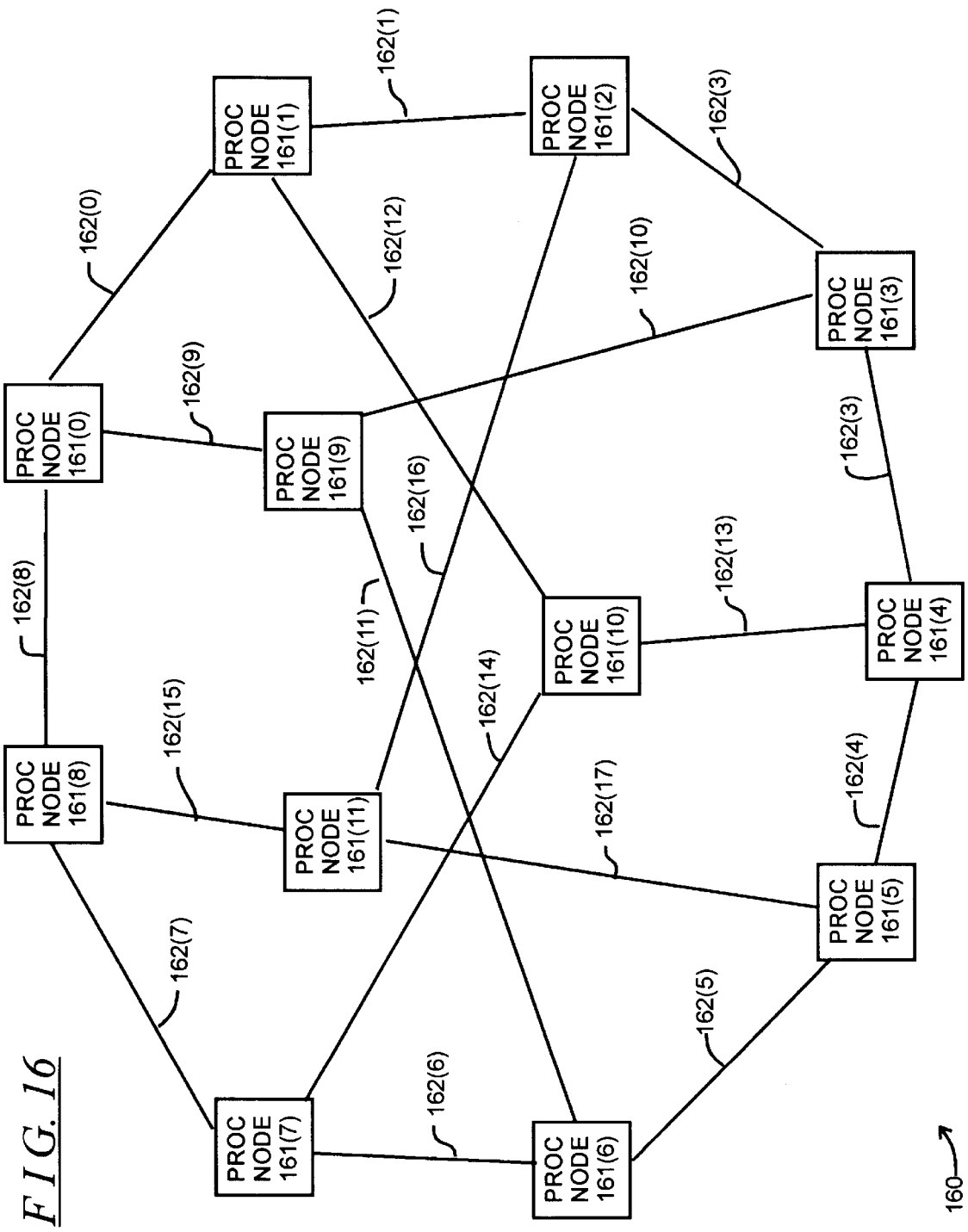

FIGS. 16 through 19 depict interconnection subsystems with interconnection graphs of diverse polygonal forms for interconnecting larger numbers of processing nodes. FIG. 16 depicts a multiprocessor computer system 160 comprising twelve processing nodes 161(0) through 161(11). The multiprocessor computer system 160 includes an interconnection subsystem comprising communication links 162(0) through 162(8) defining a ring interconnecting nine of the processing nodes 161(0) through 161(8). Each of the remaining three processing nodes 161(9) through 161(11) is connected by communication links 161(9) through 161(17) to three processing nodes in the outer ring 161(i), 161(i+3) and 161(i+6), with index "i" corresponding to "zero," "one," and "two" respectively for processing nodes 161(9) through 161(11). The interconnection subsystem depicted in FIG. 16 provides a diameter of "three," an average distance of 7/4 and a normalized bisection bandwidth of "one."

Figure 17:
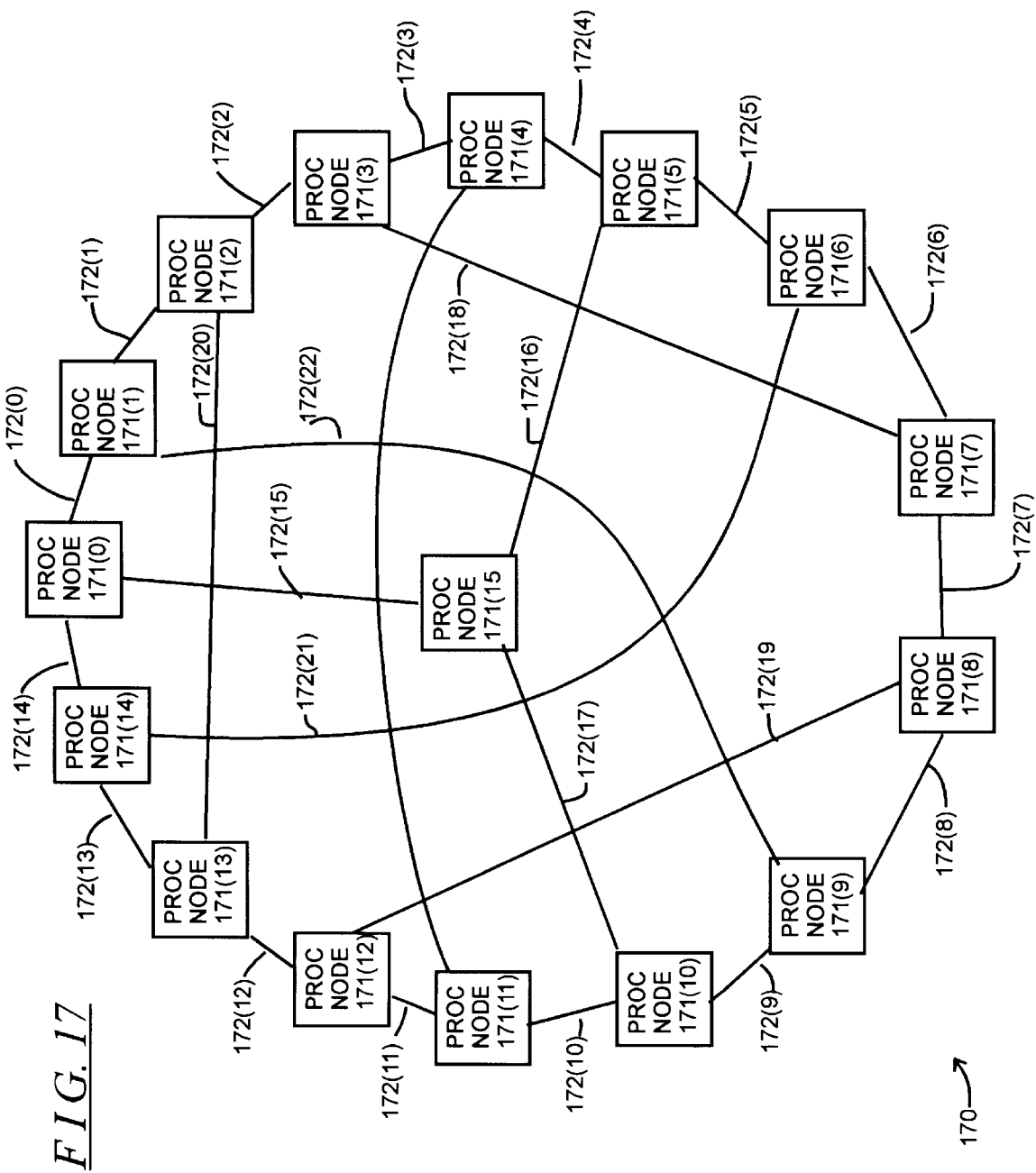
Figure 18:
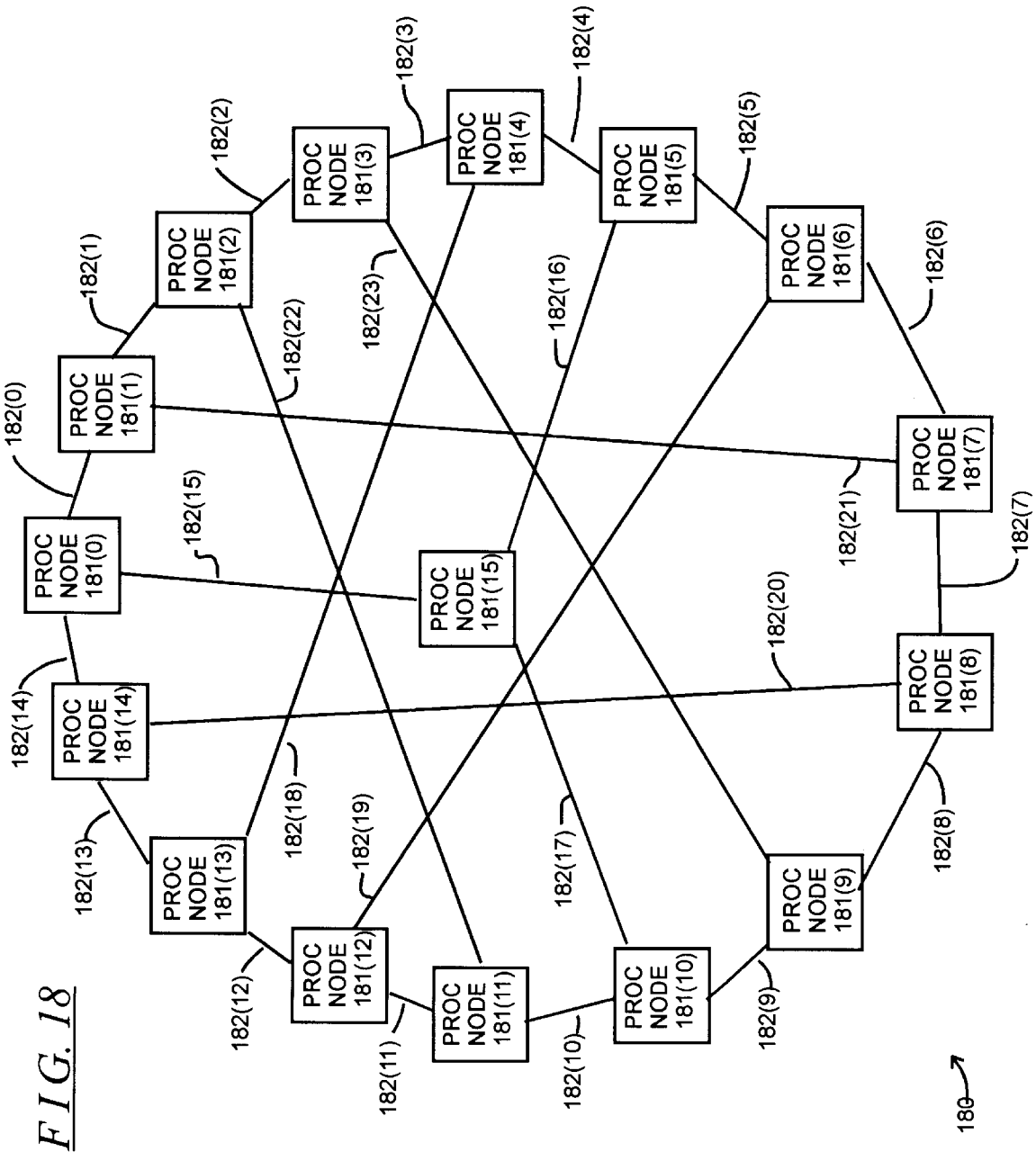

FIGS. 17 and 18 depict multiprocessor computer systems 170 and 180 including interconnection subsystems comprising communication links 182(1) for interconnecting sixteen processing nodes 171(n), 181(n), fifteen of which are connected in a ring. In both systems 170 and 180, communication links connect the sixteenth processing node 171(15), 181(15) symmetrically about the respective ring to processing nodes 171(i), 171(i+5) and 171(i+10) (in the case of processing node 171(15)), and 181(i), 181(i+5) and 181(i+10) (in the case of processing node 181(15)), with index "i" having the value "zero" in the systems 170 and 180 depicted in FIGS. 17 and 18. The communication links interconnecting processing node 171(15), 181(15) and processing nodes in the respective rings effectively trisect the respective rings. In multiprocessor computer system 170, other communication links symmetrically connect the processing nodes 171 (4) and 171(8), processing nodes 171(9) and 171(13), and processing nodes 171(14) and 171(3), across chords of the ring, and other communication links interconnect processing nodes 171(2) and 171(10), and processing nodes 171(5) and 171(12) across the approximate diameter of the ring. In the multiprocessor computer system 180, communication links connect all processing nodes, other than those processing nodes connected to processing node 181(15), across the approximate diameter of the ring. Both interconnection subsystems have a diameter of "three," an average distance of 33/16 (approximately 2.0625) and a normalized bisection bandwidth of 3/4.

Figure 19:
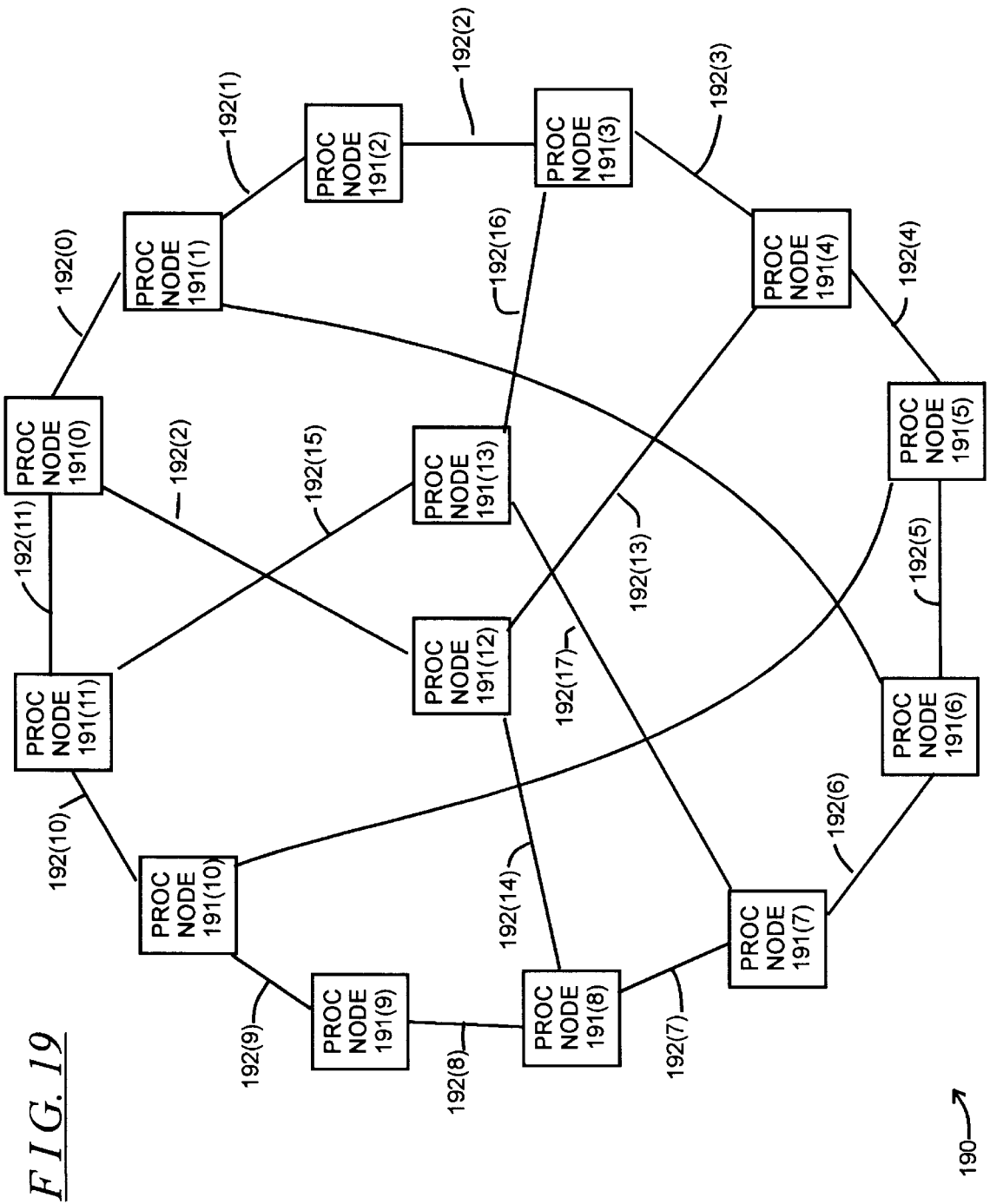

FIG. 19 depicts a final illustrative multiprocessor computer system 190 including interconnection subsystem of the polygonal class, for interconnecting fourteen processing nodes 191(0) through 191(13) (generally identified by reference numeral 191(n)). Communication links 192(0) through 192(11) connect twelve of the processing nodes 191(0) through 191(11) in a ring, and communication links 192(12) through 192(17) connect processing nodes 191(12) and 191(13) so as to trisect the ring defined by processing nodes 191(0) through 191(11). Other communication links 192(18) through 192(20) effectively define chords across the ring. The interconnection subsystems depicted in FIGS. 17 through 19 are illustrative of interconnection subsystems having interconnection graphs in the form of "trisected rings" of "N" ("N" comprising a selected integer) processing nodes of degree-three switching elements, in which "N-k" ("k" comprising a selected integer, k<N) processing nodes are connected in a ring and "k" processing nodes are in the center of the ring. Each of the processing nodes in the center of the ring are, in turn, connected to three processing nodes in the ring at intervals approximately one-third of the way around the ring, and other connections define chords of the ring.

Systems having interconnection subsystems with interconnection graphs having other polygonal forms will be apparent to those skilled in the art.

Figure 5:
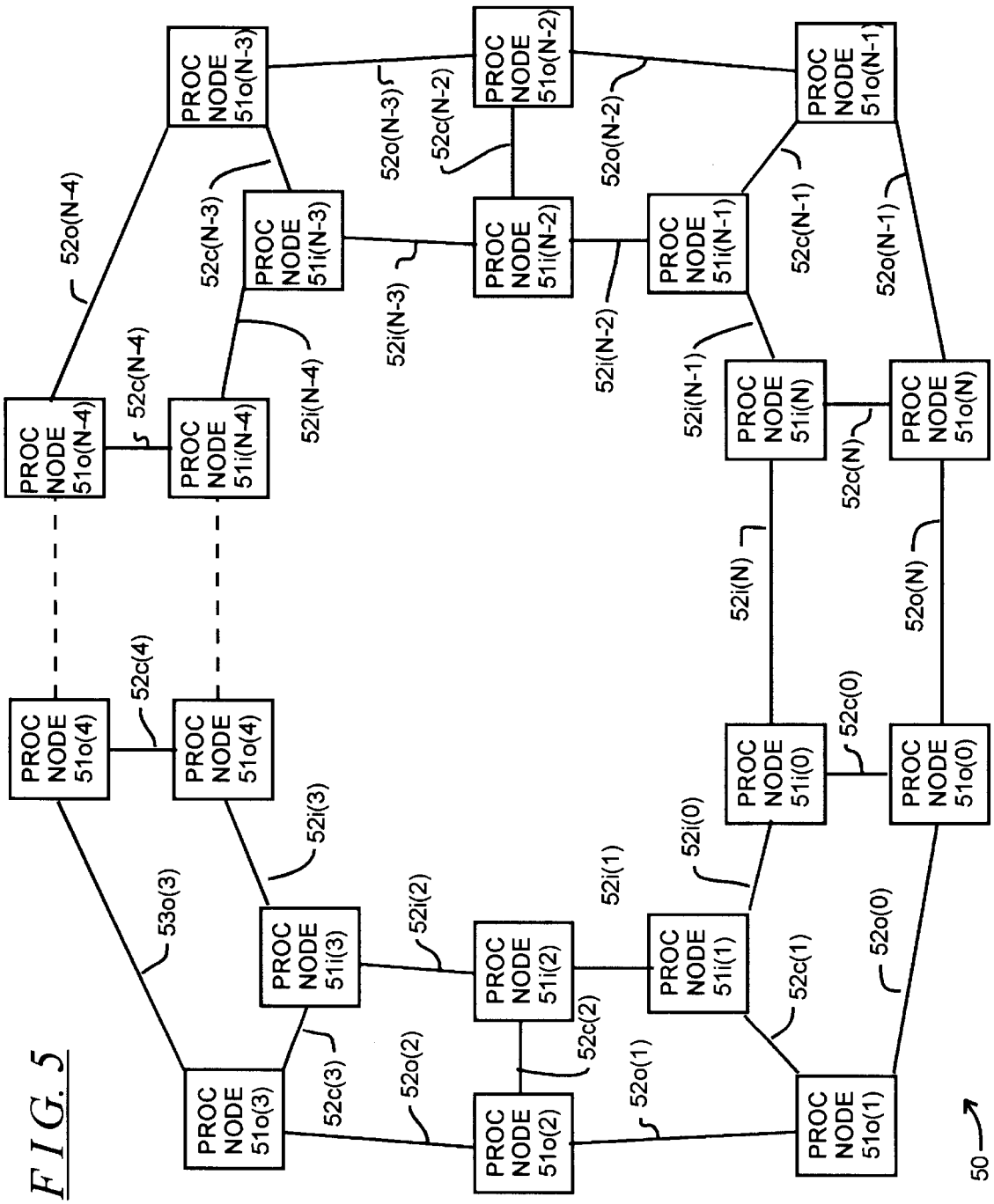

Systems having interconnection subsystem with interconnection graphs of the ladder class will be described in connection with FIGS. 5 through 7. FIG. 5 depicts a system 50 comprising a plurality of processing nodes 51i(0) through 51i(N) and 51o(0) through 51o(N) (generally identified by reference numerals 51i(n)) and 51o(n), respectively, where "i" refers to "inner" and "o" refers to "outer" as shown in FIG. 5, and collectively identified by reference numeral 51(x)(n)). Processing nodes 51i(n) are serially connected by communication links 52i(0) through 52i(N), and processing nodes 51o(n) are serially connected by communication links 52o(0) through 51o(N). Processing nodes having corresponding indices "n" are also interconnected by communication links 52c(0) through 52c(N) (generally identified by reference numeral 52c(n), where "c" refers to "cross"). In the system 50 depicted in FIG. 5, twenty-two processing nodes are explicitly shown, so that "N" corresponds to the value "ten," although it will be appreciated that additional processing nodes may provided. In addition, a system such as that depicted in FIG. 5 may have fewer than twenty-two nodes. Further, a system such as that depicted in FIG. 5 may have a number of processing nodes 51o(n) that differs from the number of processing nodes 51i(n') (n≠n'); in that case, one or more processing nodes 51o(n) or 51i(n) will not be connected to respective processing nodes 5 1i(n) or 51o(n) by a respective communication link 52c(n). Generally, an interconnection subsystem that has an interconnection graph in the form of a ladder, as depicted in FIG. 5, will have a diameter of approximately M/4+1, an average distance of M/8+1/2 and a normalized bisection bandwidth of approximately 8/M where "M" is the total number of processing nodes 51o(n) and 51i(n) provided in the system.

Figure 6:
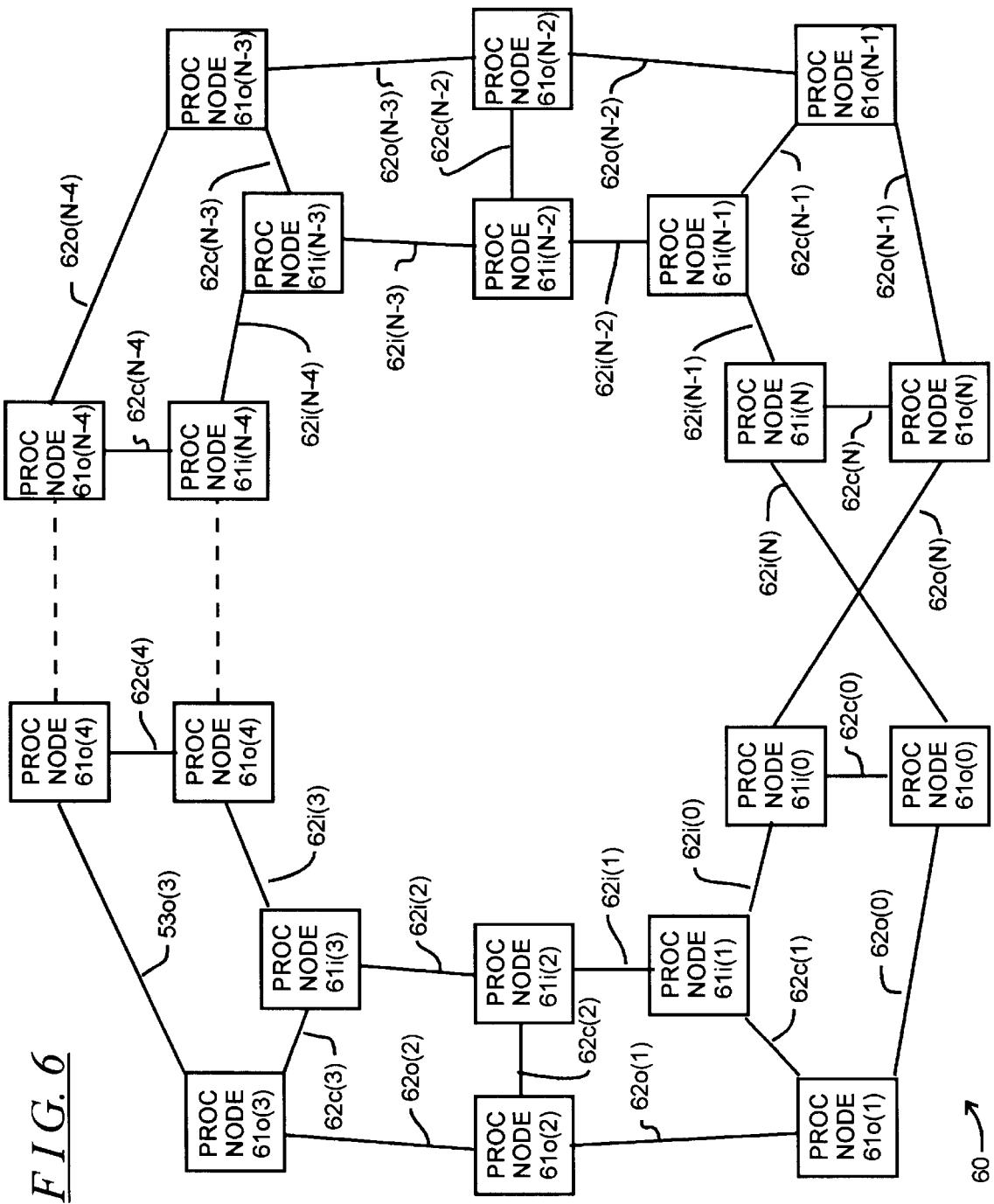

A variation on the system 50 depicted in FIG. 5 is depicted in FIG. 6. With reference to FIG. 6, that FIG. depicts a system 10 having a plurality of processing nodes 61i(0) through 61i(N) and 61o(0) through 61i(N) (generally identified by reference numerals 61i(n)) and 61o(n), respectively, where "i" refers to "inner" and "o" refers to "outer" as shown in FIG. 5, and collectively identified by reference numeral 61x(n)) interconnected by communication links generally identified by reference numeral 62i(1) and 62o(1) and 62c(1). The interconnection graph defined by the interconnection subsystem in system 60 is similar to that in system 50 (FIG. 5), except that in system 60 a communication link 62i(N) connects processing node 61i(N) to processing node 61o(0), instead of to 61i(0) as would be the case in an interconnection graph such as that associated with system 50. Similarly, in system 60 a communication link 62o(N) connects processing node 61(o)(N) to processing node 61i(0), instead of to 61o(0) as would be the case in an interconnection graph such as that associated with system 50. This "twist" interconnection of the inner and outer processing nodes 61i(n) and 61o(n) in this manner effectively interconnects the processing nodes 61(m) to form an interconnection graph in the form of a "Moebius strip" arrangement.

Figure 7:
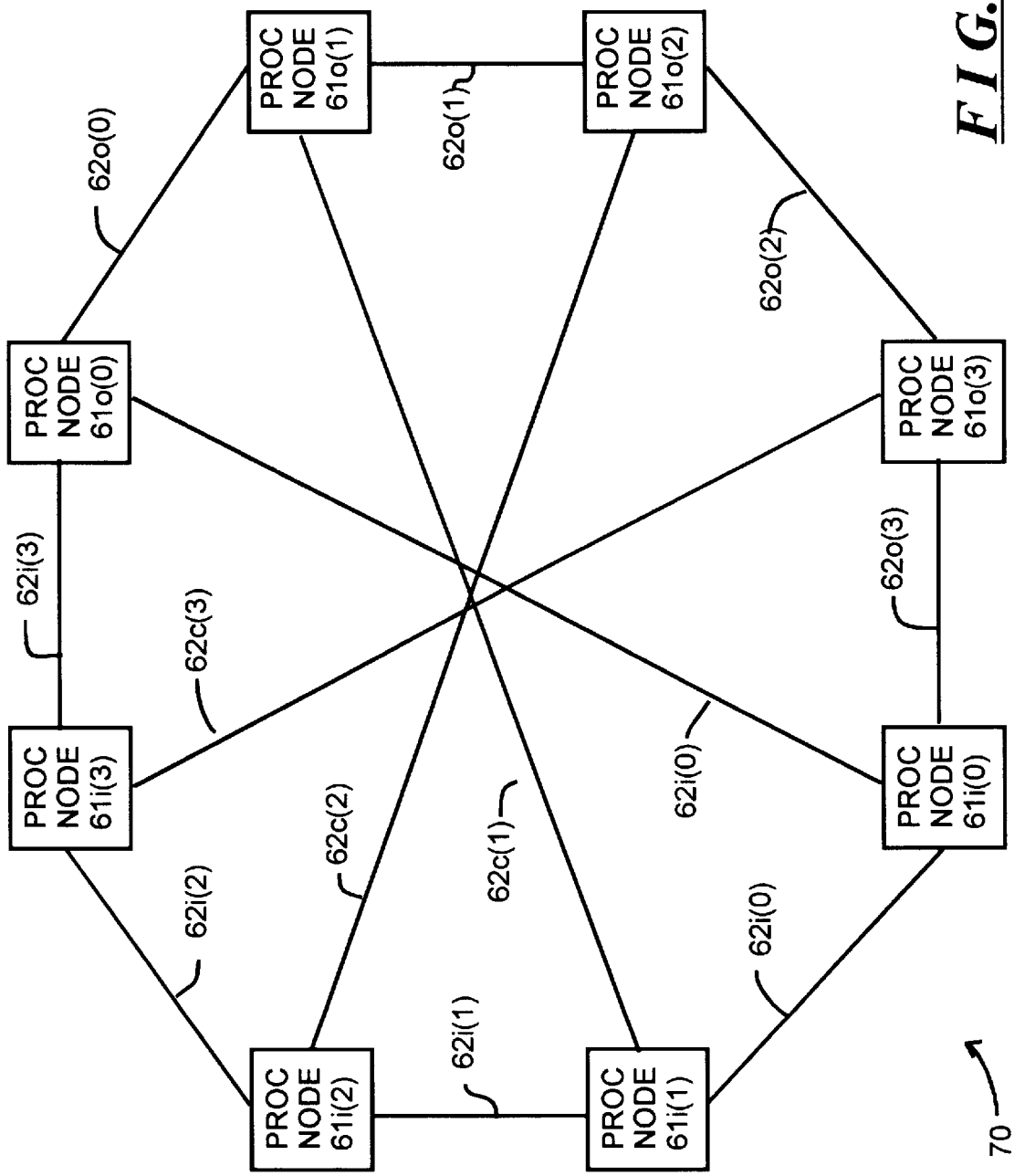

FIG. 7 depicts another representation of the interconnection graph for the system depicted in FIG. 6, for the illustrative case in which the total number of processing nodes 61i(n) and 61o(n) corresponds to eight. In the representation in FIG. 7 the interconnection graph is in the form of an octagon, with opposing processing nodes in the octagon being interconnected. It will be appreciated that the communication links 62i(1) and 62o(1) which define the octagonal graph correspond to the edges of the Moebius ladder in FIG. 6, and the communication links 62c(1) interconnecting the opposing processing nodes correspond to the rungs. From the representation depicted in FIG. 7, it is clear that the interconnection graph has a diameter corresponding to "two," an average distance corresponding to 11/8, and a normalized bisection bandwidth corresponding to "one."

As with the system 50 (FIG. 5), a system, such as system 60, which has an interconnection subsystem with an interconnection graph in the form of a Moebius strip, may have an odd number of processing nodes. In that case, one of the processing nodes will not be "paired," that is, it will not be connected to a communication link 62c(1) corresponding to a rung in the interconnection graph in the form depicted in FIG. 6. With reference to the graph in the form depicted in FIG. 7, if there are "N" (where "N" is an odd integer) processing nodes, all of the processing nodes will effectively form corners of an N-sided polygon in the interconnection graph, but one of the processing nodes will not have a communication link to an opposing processing node in the graph. Thus, for example, with reference to FIG. 7, if the system 60 comprised seven processing nodes 61x(n), such that processing node 61i(0) were not present, there would also be no communication link 62c(0). In that case, the interconnection graph has a diameter corresponding to "two," an average distance corresponding to 1.3, and a normalized bisection bandwidth corresponding to 8/7.

Figure 15:
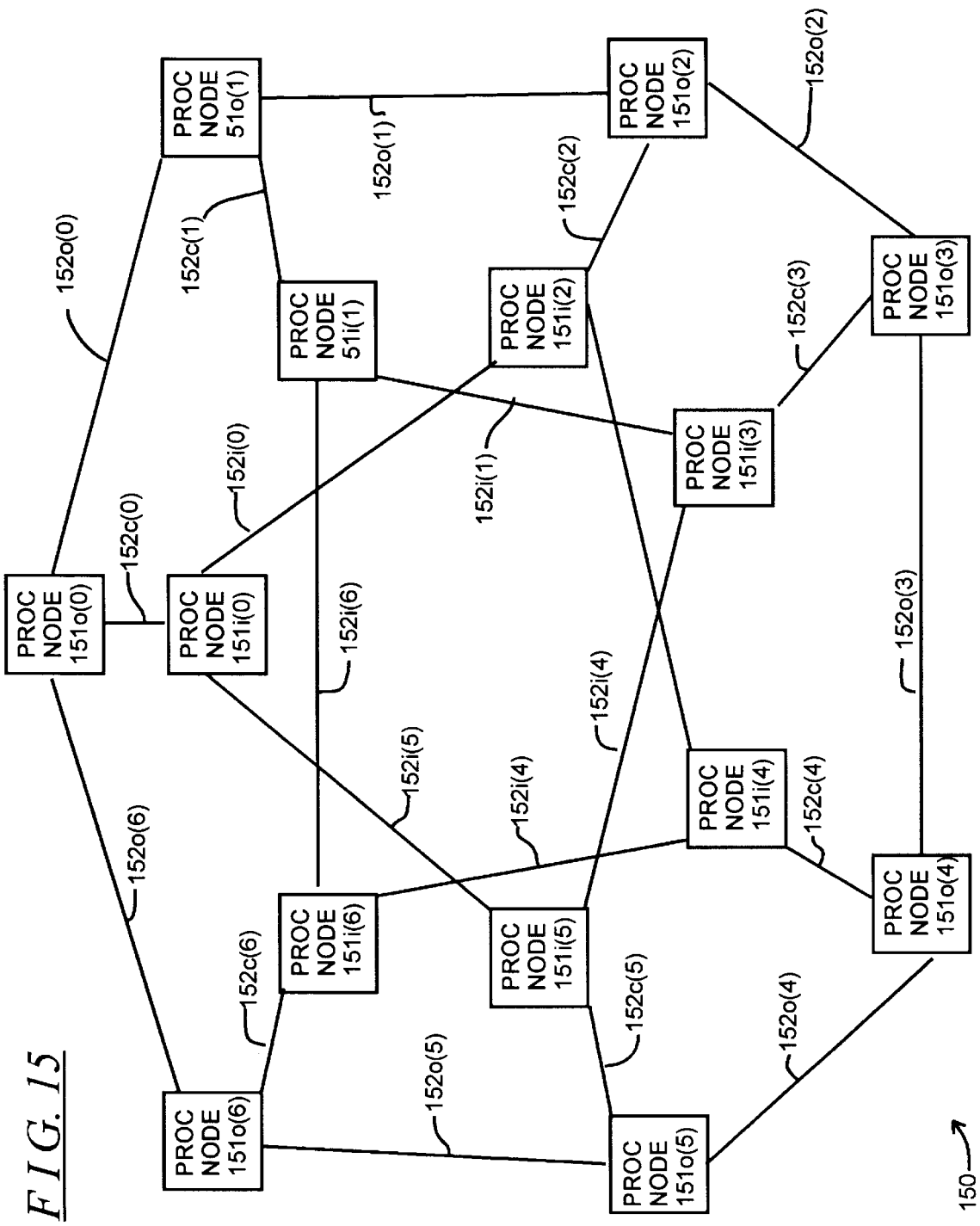

A further variation on the system depicted in FIG. 5, called herein a "modular ladder," is depicted in FIG. 15. FIG. 15 depicts a multiprocessor computer system 150 having a plurality of processing nodes 151o(0) through 151o(6) (generally identified by reference numeral 151o(n)) and processing nodes 151i(0) through 151i(6) (generally identified by reference numeral 151i(n)). As with system 50 (FIG. 5), each processing node 151o(n) is connected by a communication link 152i(n) to processing node 151o(n+b 1) ("n+1" taken modulo 7), an by a communication link 152c(n) to processing node 151i(n). However, each processing node 151i(n) operating system connected by a respective communication link 152i(n) to a processing node 151(n+2) ("n+2" taken modulo 7). Generally, for a multiprocessor computer system comprising a set of N+1 processing nodes 151o(0) through 151o(N) and a further set of N+1 processing nodes 151i(0) through 151i(N) ("N" comprising selected integer), each processing node 151i(n) is connected by a respective communication link 152i(n) to a processing node 151(n+k) ("k" a selected integer, "n+k" taken modulo "N" ). If "k" equals "one," the multiprocessor computer system corresponds to that depicted in FIG. 5. For the particular system depicted in FIG. 15, the interconnection subsystem has a diameter of "three," an average distance of 27/14 (approximately 1.93), and a normalized bisection bandwidth of "one."

Systems having interconnection subsystems with interconnection graphs having other ladder forms, such as, for example, providing additional or more extensive twisting of the interconnection graph, will be apparent to those skilled in the art.

Figure 8:
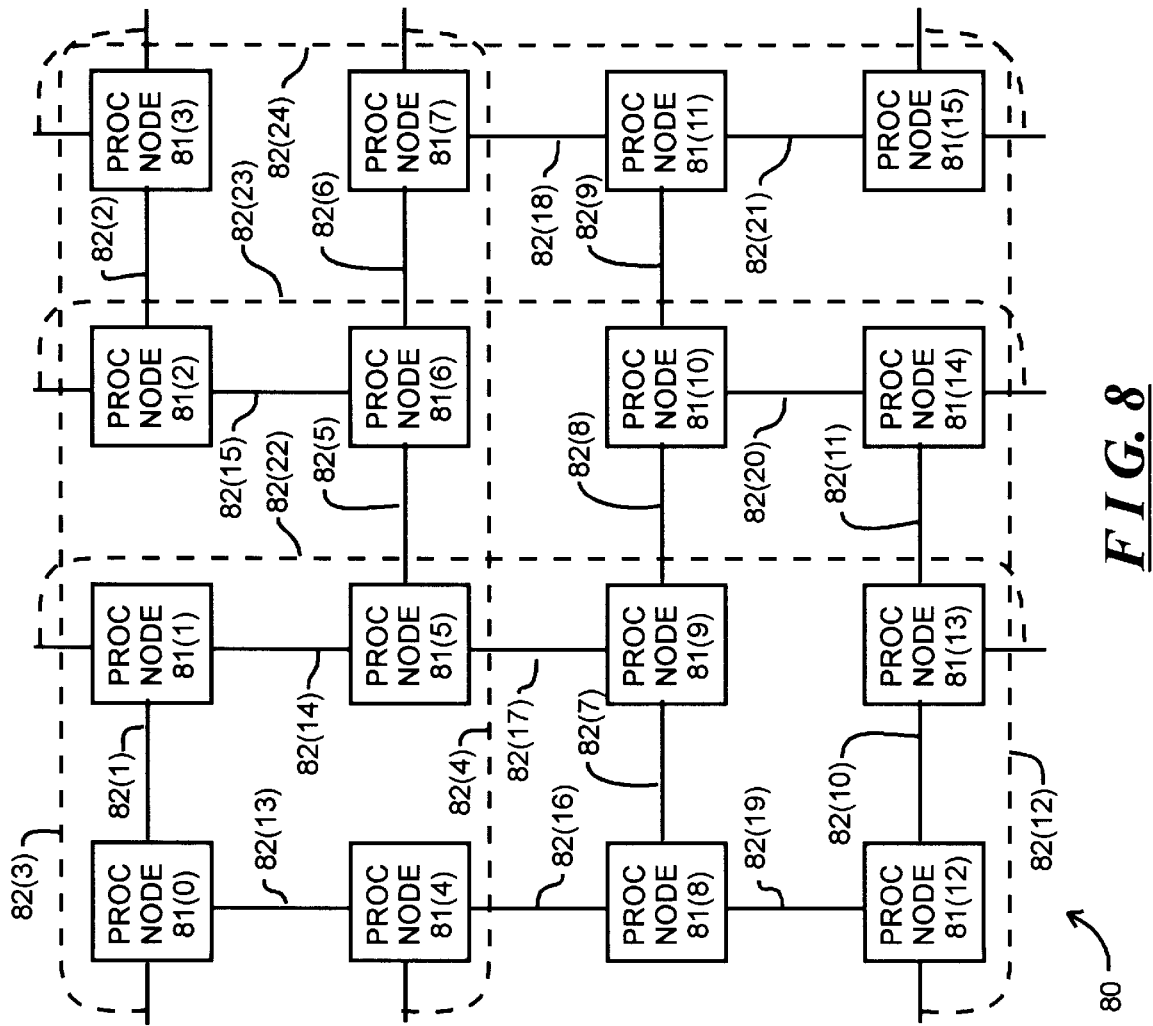
Figure 9:
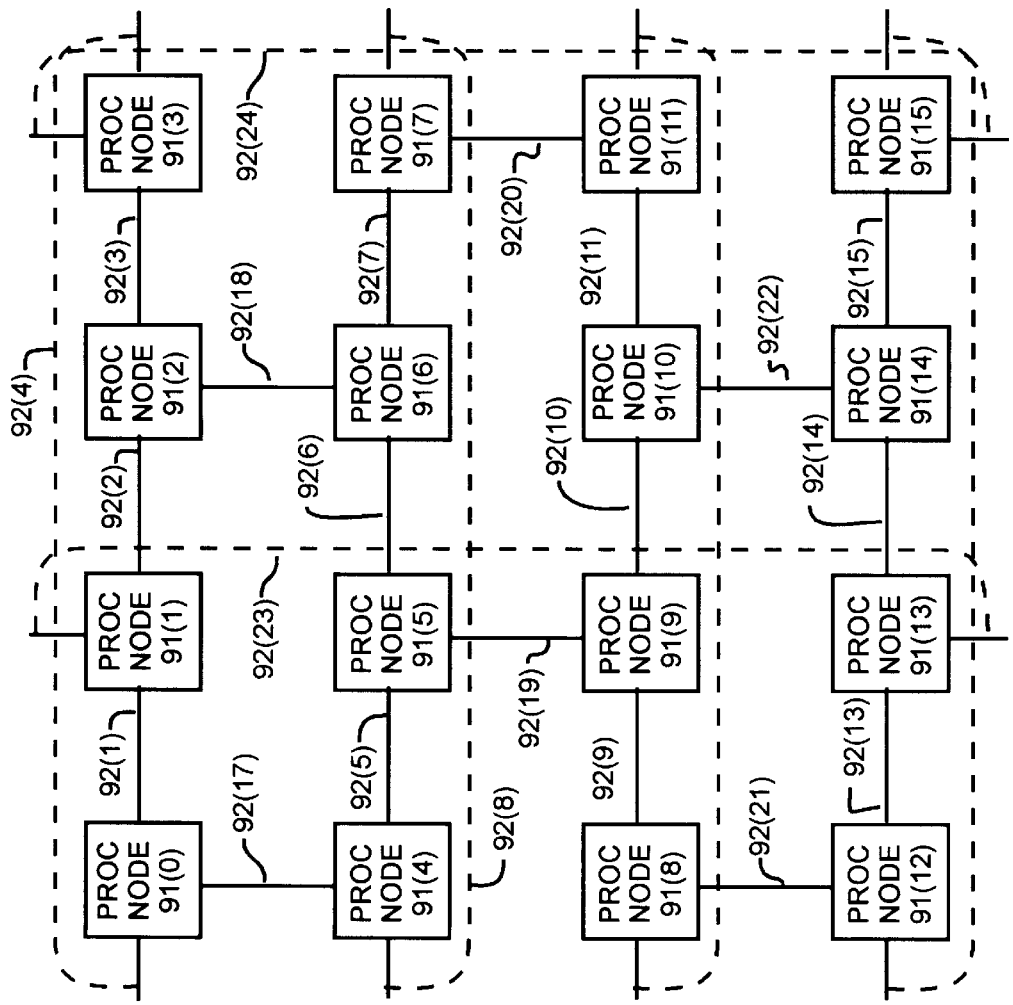
Figure 10:
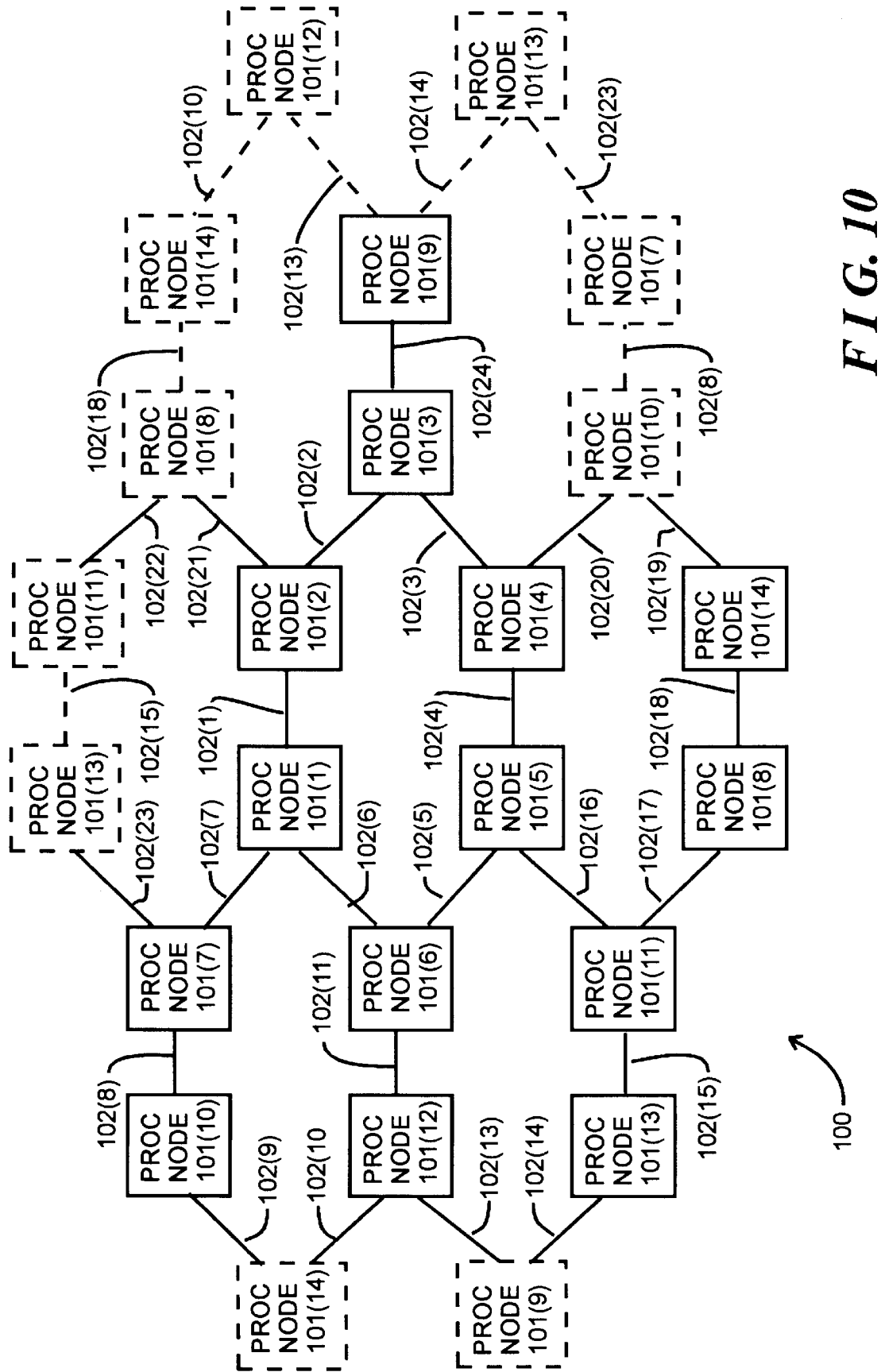

Illustrative multiprocessor computer systems having interconnection subsystem with interconnection graphs of the tiled class will be described in connection with FIGS. 8 through 10. Generally, FIGS. 8 and 9 depict systems 80 and 90, respectively, each having sixteen processing nodes interconnected by respective interconnection subsystems in which the interconnection graphs which are tiled in a generally toroidal "brick" pattern. FIG. 10 depicts a system 100 which has fourteen processing nodes interconnected an interconnection subsystem which has a folded interconnection graph having a number of sides each having a hexagonal pattern. It will be appreciated that, since the switch of each of the processing nodes in these systems are of degree three, they will not accommodate a conventional grid or toroidal pattern, since such a pattern would require the processing nodes to have switches of at least degree four.

With reference initially to FIG. 8, that FIG. depicts a system 80 comprising a plurality of processing nodes 81(0) through 81(15) (generally identified by reference numeral 81(n)) interconnected generally, but not completely, in a grid pattern by an interconnection subsystem comprising communication links 82(1) through 82(24) (generally identified by reference numeral 82(1)). The interconnection subsystem includes a number of communication links 82(1) interconnect processing nodes which are shown in FIG. 8 as being adjacent. In addition, the interconnection subsystem includes a number of other communication links, namely, communication links 82(3), 82(4), 82(12), 82(22), 82(23) and 82(24), which connect processing nodes depicted as being disposed at opposing edges of respective rows and columns in the grid pattern depicted in FIG. 8, thereby wrapping the interconnection graph to give it a partial toroidal characteristic. The communication links 82(1) through 82(24) interconnect processing nodes in an interconnection graph having a herringbone brick pattern, defining eight bricks as follows:

(1) processing nodes 81(0), 81(1), 81(4), 81(5), 81(8) and 81(9);

(2) processing nodes 81(5), 81(6), 81(7), 81(9), 81(10) and 81(11);

(3) processing nodes 81(8), 81(9), 81(10), 81(12), 81(13) and 81(14);

(4) processing nodes 81(2), 81(3), 81(0), 81(6), 81(7) and 81(4) (by means of the partial toroidal characteristic provided by communication links 82(3) and 82(4);

(5) processing nodes 81(10), 81(11), 81(14), 81(15), 81(2) and 81(3) (by means of the partial toroidal characteristic provided by communication links 82(23) and 82(24);

(6) processing nodes 81(13), 81(14), 81(1), 81(2), 81(5) and 81(6) (by means of the partial toroidal characteristic provided by communication links 82(22) and 82(23);

(7) processing nodes 81(7), 81(4), 81(11), 81(8), 81(15) and 81(12) (by means of the partial toroidal characteristic provided by communication links 82(4) and 82(12); and (8) processing nodes 81(3), 81(0), 81(1), 81(15), 81(12) and 81(13) (by means of the toroidal characteristics provided by communication links 82(3), 82(12), 82(22) and 82(24).

It will be appreciated that the interconnection subsystem for system 80 has a diameter of "four," an average distance of 17/8, and a normalized bisection bandwidth of 3/4.

FIG. 9 depicts a system 90 which, like system 80, comprises a plurality of processing nodes 91(0) through 91(15) (generally identified by reference numeral 81(n)) interconnected generally, but not completely, in a grid pattern by an interconnection subsystem comprising communication links 92(1) through 92(24) (generally identified by reference numeral 92(1)). The interconnection subsystem includes a number of communication links 92(1) interconnect processing nodes which are shown in FIG. 9 as being adjacent. In addition, the interconnection subsystem includes a number of other communication links, namely, communication links 92(4), 92(8), 92(12), 92(16), 92(23) and 92(24), which connect processing nodes depicted as being disposed at opposing edges of respective rows and columns in the grid pattern depicted in FIG. 9, thereby wrapping the interconnection graph to give it a partial toroidal characteristic. The communication links 92(1) through 92(24) interconnect processing nodes in an interconnection graph having a brick wall pattern, defining eight bricks as follows:

(1) processing nodes 91(0), 91(1), 91(2), 91(4), 91(5) and 91(6);

(2) processing nodes 91(2), 91(3), 91(0), 91(6), 91(7) and 91(4), (by means of the partial toroidal characteristic provided by communication links 92(4) and 92(8);

(3) processing nodes 91(5), 91(6), 91(7), 91(9), 91(10) and 91(8);

(4) processing nodes 91(7), 91(4), 91(5), 91(11), 91(8) and 91(9) (by means of the partial toroidal characteristic provided by communication links 92(8) and 92(12);

(5) processing nodes 91(8), 91(9), 91(10), 91(12), 91(13) and 91(14);

(6) processing nodes 91(10), 91(11), 91(8), 91(14), 91(15) and 91(12) (by means of the partial toroidal characteristic provided by communication links 92(12) and 92(16)

(7) processing nodes 91(13), 91(14), 91(15), 91(1), 91(2) and 91(3) (by means of the partial toroidal characteristic provided by communication links 92(23) and 92(24); and (8) processing nodes 91(15), 91(12), 91(13), 91(3), 91(0) and 91(1) (by means of the partial toroidal characteristic provided by communication links 92(24) and 92(23).

It will be appreciated that the interconnection subsystem for system 80 has a diameter of "four," an average distance of 9/4 (2.25), and a normalized bisection bandwidth of 1/2.

As a final illustration of a multiprocessor computer system having an interconnection subsystem with an interconnection graph of the tiled class, FIG. 10 depicts a multiprocessor computer system 100 having fourteen processing nodes 101(1) through 101(14) (generally identified by reference numeral 101(n)) interconnected by an interconnection system comprising a plurality of communication links generally identified by reference numeral 102(1). The interconnection system defines an interconnection graph in a folded pattern having a plurality of sides, each in the form of a hexagon. To emphasize the folded nature of and hexagonal shapes in the interconnection graph, some of the processing nodes and communication links are depicted on FIG. 10 a plurality of times; in such cases the processing node 101(n) and communication link 102(1) is depicted once using a solid box or line, and otherwise using a dashed box or line. Thus, for example, processing node 101(13) is depicted three times in FIG. 10, namely, at the lower left, at the right and the top, and is represented by a solid box in the lower left and dashed boxes elsewhere. Similarly, communication link 15, which interconnects processing nodes 101(13) and 101(11), is depicted twice in FIG. 10, namely, in the lower left and at the top, and is represented by a solid line in the lower left and a dashed line elsewhere. It will be appreciated that the interconnection system for system 100 has a diameter of "three," an average distance of 27/14, which corresponds to approximately 1.93, and a normalized bisection bandwidth of "one."

Systems having interconnection subsystems with interconnection graphs having other tiled forms will be apparent to those skilled in the art.

In the multiprocessor computer systems described above in connection with FIGS. 1 through 10, the interconnection subsystems included communication links which were bidirectional, that is, they could transfer information in both directions between respective processing nodes connected thereto. Accordingly, each degree-three switch associated with each processing node was connected to three communication links, that is, three wires, optical fibers or the like. It will be appreciated, however, that a bidirectional communication link "system" can instead comprise two unidirectional communication links, each of which can transfer information in one direction, with the switches connected to the unidirectional communication links transferring information in opposite directions. Accordingly, in such a system, if the same two processing nodes are connected to both unidirectional communication links comprising the bidirectional communication link system, each processing node can transfer information to the other processing node over one of the unidirectional communication links.

Typically, in multiprocessor computer systems including such bidirectional communication link systems (that is, a communication link system comprising two unidirectional communication links for transferring information in opposite directions), both unidirectional communication links in the bidirectional communication link system are connected to the same pair of processing nodes. In a further aspect of the invention, described in connection with FIGS. 11 through 14, the unidirectional communication links in the various bidirectional communication link systems can be connected to different processing nodes, thereby providing interconnection subsystems which have interconnection graphs with good communications metrics.

Figure 11:
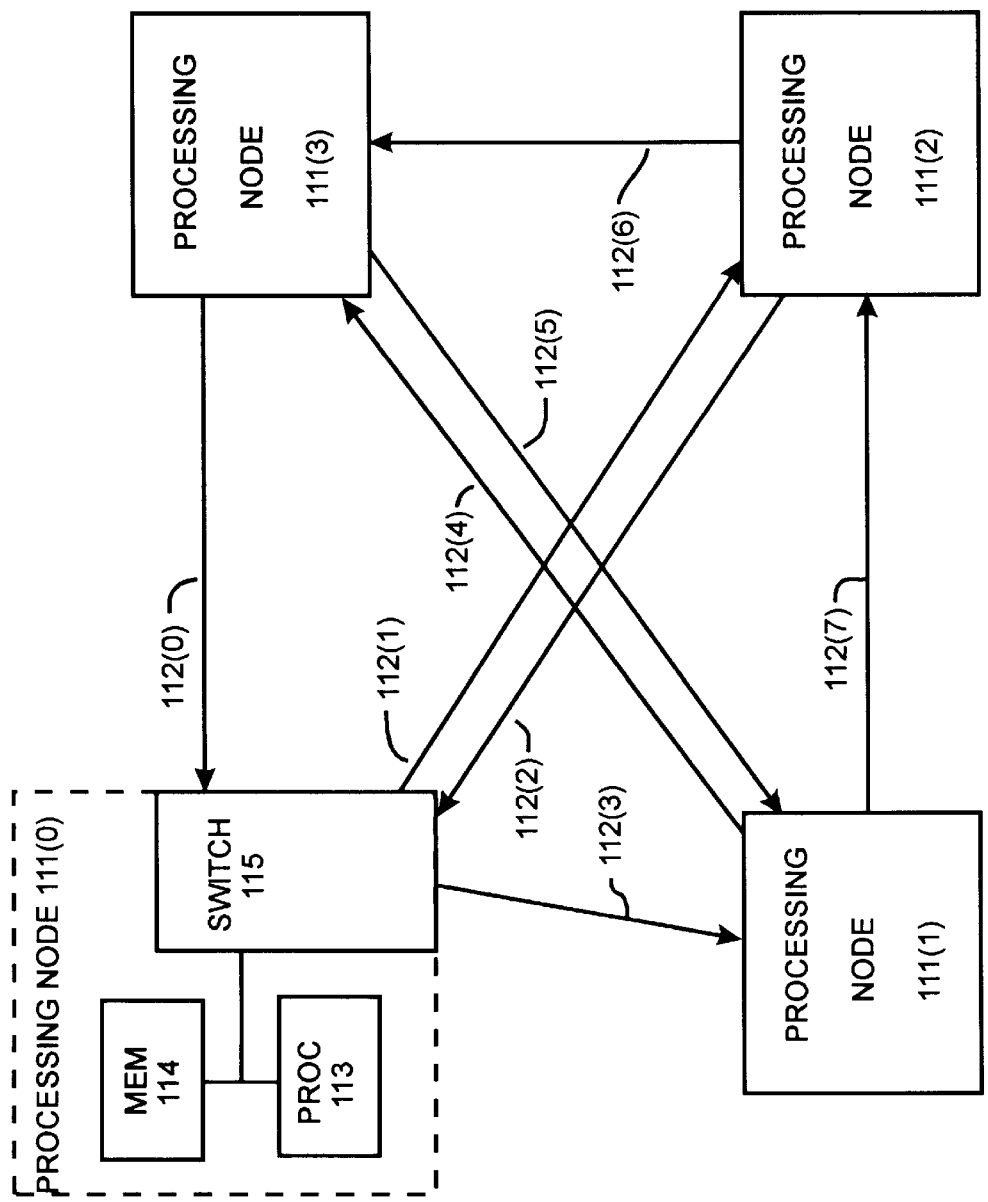

With reference initially to FIG. 11, that FIG. depicts an multiprocessor computer system 110 comprising four processing nodes 111(0) through 111(3) (generally identified by reference numeral 111(n)) interconnected by an interconnection subsystem having an interconnection graph generally defining a parallelogram. The interconnection subsystem of the multiprocessor computer system 110 comprises a plurality of unidirectional communication links generally identified by reference numeral 112(1). As with the processing nodes comprising the multiprocessor computer systems described above in connection with FIGS. 1 through 10, each processing node 111(n) includes a processor 113, memory 114 and switch 115. However, switch 115 provides two sets of unidirectional terminals for connection to respective unidirectional communication links 112(1), with each set of unidirectional connections including a connection for transmitting information over the communication link 112(1) connected thereto and a separate connection for receiving information over the communication link 112(1) connected thereto. Accordingly, each communication link 112(1) is unidirectional, transferring information from one processing node 111(n) to another processing node 111(n') (n'≠n) in the direction depicted by the arrowhead associated with each communication link 112(1). It will be appreciated that the switch 115 of each processing node 11(n) is effectively of degree two, since it has two sets of bidirectional connections.

It will be appreciated that the interconnection subsystem of multiprocessor computer system 110 has a diameter of "two," an average distance of "one" and a normalized bisection bandwidth of "one." The diameter of "two" arises from the fact that each processing node 111(n) is connected to communication links that will transmit information to two other processing nodes 111(n+1) and 111(n+2), and so each processing node 111(n) can transfer information to processing node 111(n+3) by first transferring the information to processing node 111(n+2), which can then forward the information to processing node 111(n+3) (all indices "n+1," "n+2" and "n+3" taken modulo "four" ).

Figure 12:
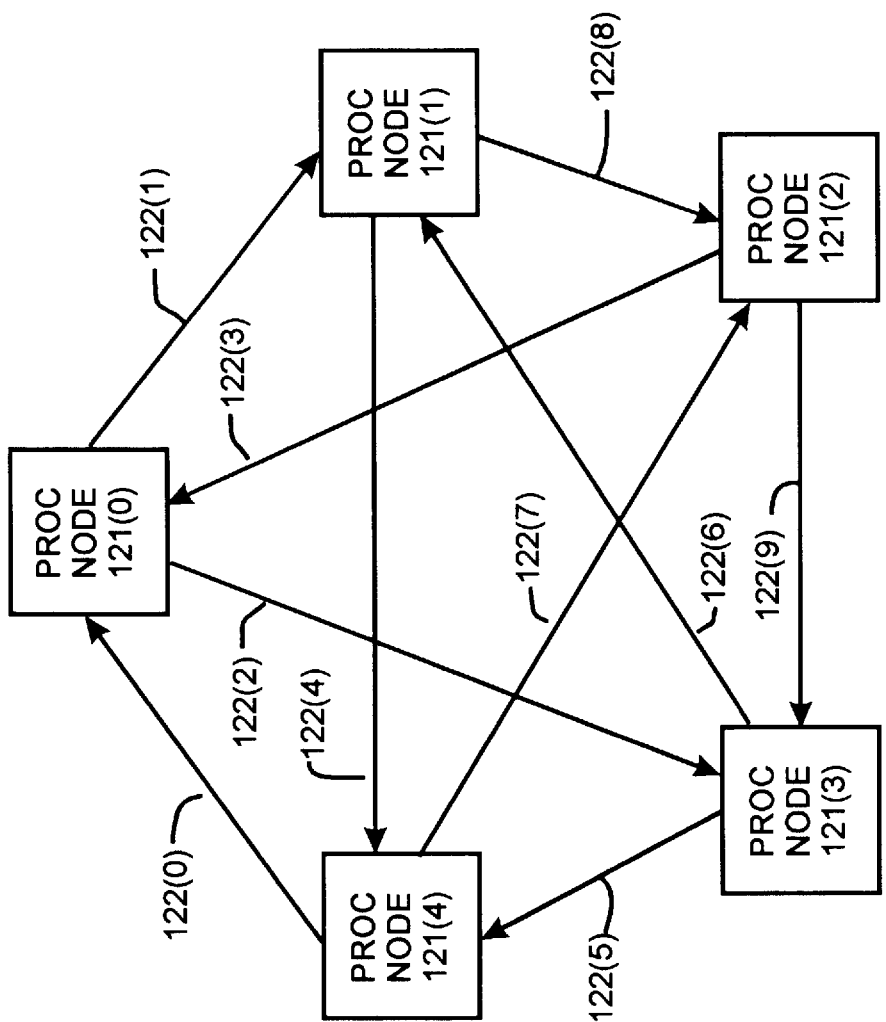
Figure 13:
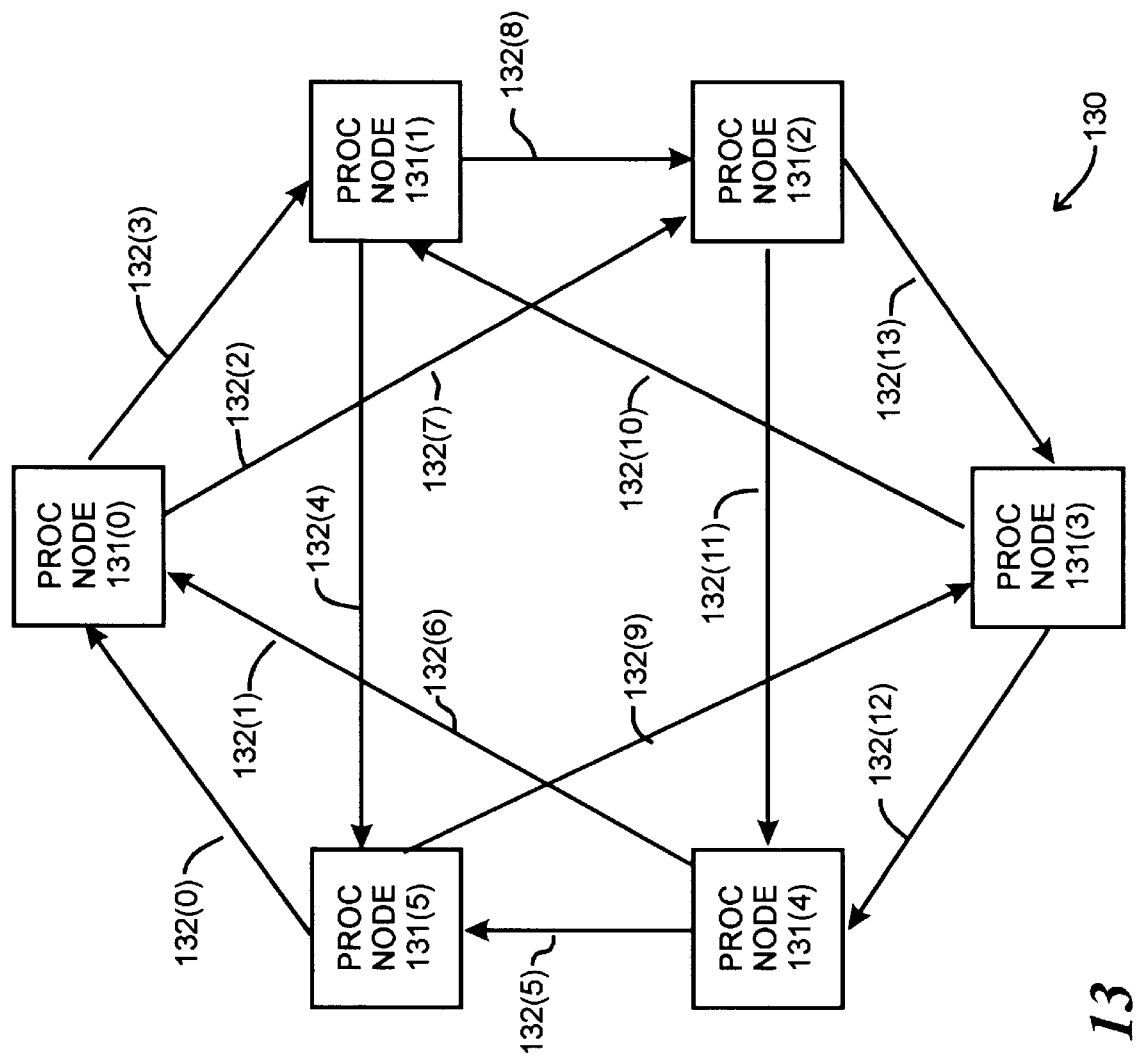

FIGS. 12 and 13 depict block diagrams of multiprocessor computer systems 120 and 130, which respectively, include five and six processing nodes generally identified by reference numerals 121(n) and 131(n), interconnected by respective interconnection subsystem which have interconnection graphs in the form of a pentagon (in the case of multiprocessor computer system 120 in FIG. 12) and a hexagon (in the case of multiprocessor computer system 130 in FIG. 13). As with multiprocessor computer system 110 (FIG. 11), the interconnection subsystems of respective multiprocessor computer systems 120 and 130 comprise unidirectional communication links generally identified by reference numerals 122(1) and 132(1), with each communication link 122(1), 132(1) being configured to transfer information from one processing node 121(n), 131(n), to another processing node 121(n'), 131(n') (n'≠n) in the direction indicated by the arrowhead associated with each communication link 122(1), 132(1). In the case of the multiprocessor computer system 120 (FIG. 12), the interconnection subsystem provides an interconnection graph having a diameter of "two," an average distance of 6/5 and a normalized bisection bandwidth of 4/5. In the case of multiprocessor computer system 130 (FIG. 13), the interconnection subsystem provides an interconnection graph that also has a diameter of "two," and has an average distance of 4/3 and a normalized bisection bandwidth of "one."

It will be appreciated that multiprocessor computer systems having other numbers of processing nodes and interconnected by unidirectional communication links can be constructed in a manner similar to multiprocessor computer systems 110, 120 and 130, depicted in FIGS. 11 through 13.

Figure 14:
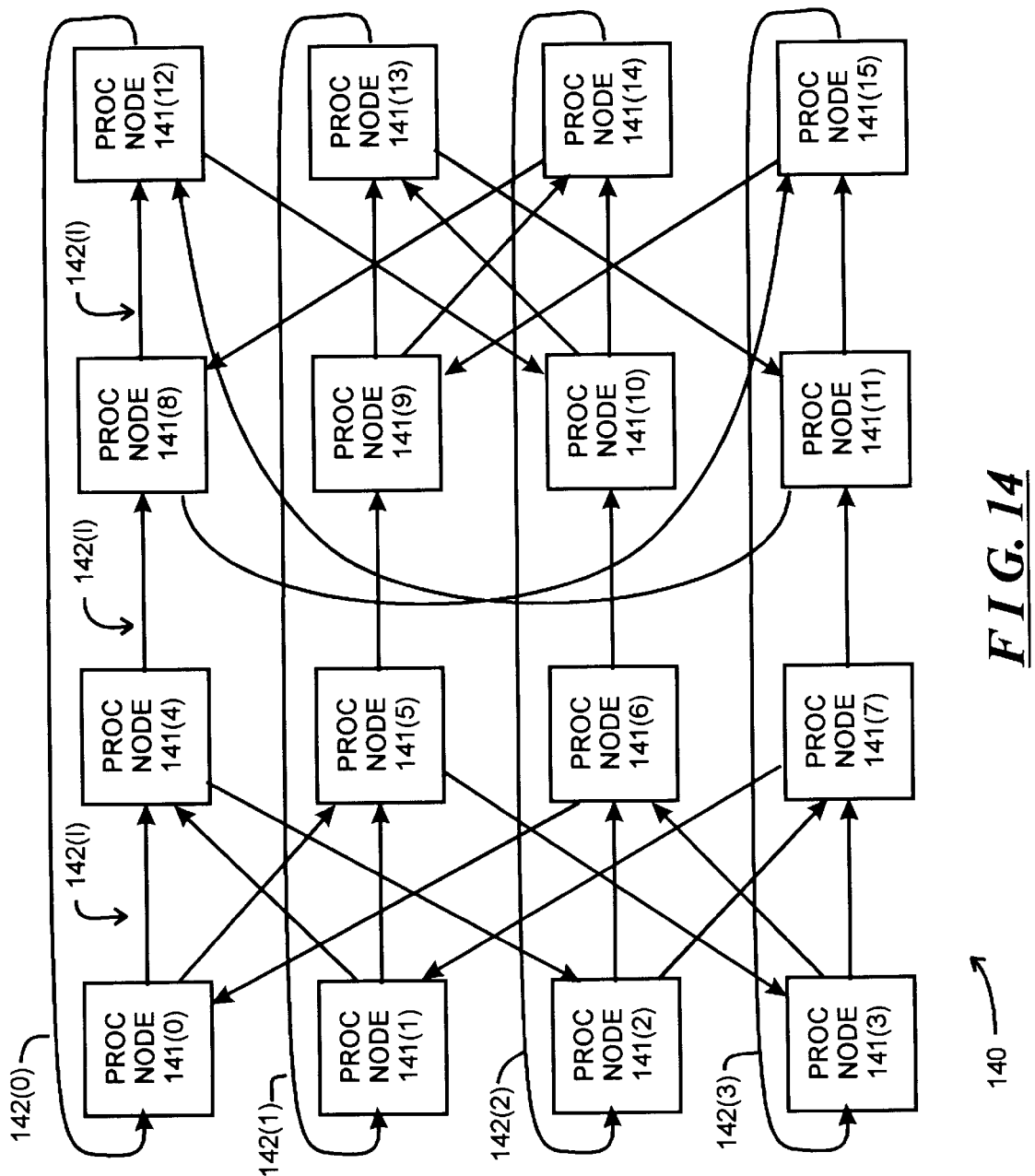

Interconnection subsystems having unidirectional communication links can also be used to interconnect processing nodes similar to processing node 111(1) (FIG. 11) in multiprocessor computer systems having generally a mesh interconnection graph. FIG. 14 depicts a block diagram of an multiprocessor computer system 140 including a sixteen processing nodes 141(0) through 141(15) (generally identified by reference numeral 141(n)), interconnected by communication links generally identified by reference numeral 142(1). As with FIGS. 11 through 13, the communication links 142(1) are unidirectional, transferring information from processing node 141(n) to processing node 141(n') (n'≠n) in the direction indicated by the arrowhead associated with each communication link 142(1). The interconnection subsystem associated with multiprocessor computer system 140 provides an interconnection graph that has a diameter of "four," an average distance of 80/32 (that is, 2.5), and a normalized bisection bandwidth of 1/2.

It will be appreciated that multiprocessor computer systems having other numbers of processing nodes and interconnected by unidirectional communication links in a generally mesh interconnection graph can be constructed in a manner similar to multiprocessor computer system 140 (FIG. 14).

The invention provides a number of advantages. In particular, it provides a number of interconnection subsystems for interconnecting processing nodes of a predetermined degree in a multiprocessor computer system, with the interconnection subsystems providing good or optimal communications characteristics.

It will be appreciated that a number of modifications may be made to the multiprocessor computer systems depicted herein. For example, interconnection subsystems of each of the various classes described above in connection with FIGS. 1 through 10, including the polygonal class, the ladder class and the tiled class may be used in connection with multiprocessor computer systems having a variety of numbers of processing nodes, and may also be used in connection with processing nodes having differing degrees than those described herein. Similarly, the interconnection subsystems having unidirectional communication links, similar to those described above in connection with FIGS. 11 through 14, may be used in connection with multiprocessor computer systems having a variety of numbers of processing nodes, and may also be used with processing nodes having differing degrees than those described herein.

Furthermore, the invention may be used in connection with multiprocessor computer systems whose processing nodes structured differently than described herein, or in which one or more of the nodes functions primarily or exclusively as memory, from which other nodes can obtain information for processing.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. An interconnection subsystem for interconnecting a predetermined maximum number of nodes, the predetermined maximum number of nodes being other than a power of two each node having a predetermined maximum number of connections, said predetermined maximum number of connections being greater than two and less than one less than the number of nodes, for transferring information, the nodes' respective connections being interconnected by communication links in the form of a polygonal topology in which a subset of the nodes are connected in a ring having a plurality of sides corresponding to the number of nodes in said subset, and others of said nodes are connected to at least some of the nodes in the ring.

2. An interconnection subsystem as defined in claim 1 in which the connections are bidirectional.

3. An interconnection subsystem as defined in claim 1 in which at least one node is a processing node, said processing node including a processor.

4. An interconnection subsystem as defined in claim 1 in which said communication links interconnect at least some of said others of said nodes to symmetrically-disposed ones of the nodes connected in said ring.

5. An interconnection subsystem as defined in claim 4 in which said communication links interconnect said at least some of said others of said nodes to ones of the nodes connected in the ring to n-sect the ring, where "n" corresponds to the maximum number of [bidirectonal] bidirectional connections.

6. An interconnection subsystem as defined in claim 5 in which said communication links interconnect at least some of the nodes in said ring to nodes in said ring other than neighboring nodes of said at least some of the nodes in the ring, thereby to provide connections forming at least one chord of said ring.

7. An interconnection subsystem as defined in claim 1 in which said communication links interconnect at least some of the nodes in said ring to nodes in said ring other than neighboring nodes of said at least some of the nodes in the ring, thereby to provide connections forming at least one chord of said ring.

8. An interconnection subsystem as defined in claim 1 in which said predetermined maximum number of connections is three.

* * * * *